US008705169B2

(12) United States Patent  (10) Patent No.: US 8,705,169 B2
Granados  (45) Date of Patent: Apr. 22, 2014

(54) GLASS PRODUCTS WITH ANTI-REFLECTION PROPERTIES AND METHODS FOR THE PRODUCTION AND USE THEREOF

(76) Inventor: Juan Luis Rendon Granados, Guanajuato (MX)

( * ) Notice: Subject to any disclaimer, the term of this patent is extended or adjusted under 35 U.S.C. 154(b) by 200 days.

(21) Appl. No.: 12/920,069

(22) PCT Filed: Oct. 19, 2009

(86) PCT No.: PCT/MX2009/000113
§ 371 (c)(1),
(2), (4) Date: Jan. 18, 2011

(87) PCT Pub. No.: WO2010/107291
PCT Pub. Date: Sep. 23, 2010

(65) Prior Publication Data
US 2011/0317257 A1  Dec. 29, 2011

(30) Foreign Application Priority Data
Mar. 17, 2009  (MX) .................... MX/a/2009/002822

(51) Int. Cl.
*G06K 7/10*  (2006.01)
(52) U.S. Cl.
USPC ........................................................ 359/350
(58) Field of Classification Search
USPC ............................. 359/350–361; 136/243–265
See application file for complete search history.

(56) References Cited

U.S. PATENT DOCUMENTS

| 1,529,239 | A |   | 3/1925  | Callard |
|---|---|---|---|---|
| 2,887,010 | A | * | 5/1959  | Ruettiger ...................... 359/888 |
| 4,086,074 | A |   | 4/1978  | Minot et al. |
| 4,880,677 | A |   | 11/1989 | Hecq et al. |
| 6,071,314 | A |   | 6/2000  | Baxter et al. |
| 6,228,211 | B1 |  | 5/2001  | Jeong |
| 7,230,779 | B2 | * | 6/2007  | Kunii et al. .................. 359/888 |
| 8,187,481 | B1 | * | 5/2012  | Hobbs ............................ 216/24 |
| 2002/0139474 | A1 |   | 10/2002 | Nomura et al. |
| 2003/0127189 | A1 |   | 7/2003  | Park |
| 2003/0170459 | A1 |   | 9/2003  | Lin |
| 2006/0226341 | A1 | * | 10/2006 | Washisu ..................... 250/208.1 |
| 2007/0183069 | A1 | * | 8/2007  | Abe et al. ...................... 359/888 |
| 2010/0014178 | A1 | * | 1/2010  | Okami et al. ................. 359/888 |

FOREIGN PATENT DOCUMENTS

| CN | 1357781   | 7/2002  |
|---|---|---|
| DE | 29917354  | 1/2000  |
| ES | 2004915   | 2/1989  |
| ES | 2021250   | 10/1991 |
| FR | 2273776   | 1/1976  |
| GB | 190628679 | 0/1907  |
| GB | 1276550   | 6/1972  |
| GB | 2188924   | 10/1987 |
| JP | 1102401   | 4/1989  |

(Continued)

*Primary Examiner* — Stephone B Allen
*Assistant Examiner* — Tamara Y Washington
(74) *Attorney, Agent, or Firm* — Thorpe North & Western LLP

(57) ABSTRACT

Anti-reflection glass, of a smooth tact, with an aspect that does not reflect light and is pleasant at sight and glass products made therefrom are included in the present invention. Such products may in some aspects have characteristics defined by values of transmittance, absorbance, reflectance, roughness and a series of micrographs realized with a microscope of atomic force to see the morphology and structure of the anti-reflection glass.

23 Claims, 35 Drawing Sheets

(56) References Cited

FOREIGN PATENT DOCUMENTS

| | | |
|---|---|---|
| KR | 20030073230 | 9/2003 |
| KR | 20040087386 | 10/2004 |
| MX | 2008011023 | 9/2008 |
| WO | WO 0190015 | 11/2001 |
| WO | WO 2006/062385 | 6/2006 |
| WO | WO 2006/062386 | 6/2006 |
| WO | WO 2007077373 | 7/2007 |

* cited by examiner

Sample 1 and 1A

Sample 2 and 2a

GLASS PRODUCTS WITH ANTI-REFLECTION PROPERTIES AND METHODS FOR THE PRODUCTION AND USE THEREOF

FIELD OF THE INVENTION

The present invention relates to an anti-reflection glass by one or both faces, in partial or total form, produced by the process of patent MX 258792, the resulting anti-reflection glass of a smooth and smooth tact, with an aspect that does not reflect light and pleasant at sight. With defined values of transmittance, absorbance, reflectance, roughness and a series of micrographs realized with a microscope of atomic force to see the morphology and structure of the anti-reflection glass.

BACKGROUND OF THE INVENTION

At present exist different types of anti-reflection glass, but none of these has the characteristics of the anti-reflection glass by one or both faces, in partial or total form, produced by the process of patent MX 758792.

For the anti-reflection glass production by the traditional method it is done by placing the piece of glass on a special table that leaves in the open only the upper face of the glass being this the atmospheric face and putting in periphery a wax edge, placing on it paste or acid solution to obtain the anti-reflection finished; it is left that acids act during a certain time and later retire them giving a final washing to the glass piece to eliminate the rest of acids, treating only one piece at time and of small dimensions, the resulting finished is not uniform in the treated face.

Through this procedure it is not possible to treat the tinning face of the glass sheet, because the tin residues adhered to this face do not allow the uniform attack of the used solutions.

The documents CN 1357781 (SUMMARY), US2002139474, U.S. Pat. No. 6,071,314, US2003127189, U.S. Pat. No. 6,228,211, KR20040087386 (SUMMARY), KR20030073230 (SUMMARY), DE29917354U, ES2021250, U.S. Pat. No. 1,529,239, GB190628679, WO0190015, GB1276550, U.S. Pat. No. 4,086,074 and JP1102401, shows processes, compositions and glasses, but all of these are different from the process and anti-reflection glass of the present invention.

The anti-reflection glasses of the present invention have surprising properties that have not been found in other glasses. Such properties include a smooth tact and smooth appearance, with a pleasant aspect that does not reflect the light or produce glare, and pleasant at sight. These properties are not suggested and it is considered that they are new and inventive.

SUMMARY OF THE INVENTION

It is an anti-reflection glass, of a smooth and smooth tact, with an aspect that does not reflect light and pleasant at sight. With defined values of transmittance, absorbance, reflectance, roughness and a series of micrographs realized with a microscope of atomic force to see the morphology and structure of the anti-reflection glass. These anti-reflections glasses are useful in the industry of the glass and the construction. In addition it is an anti-reflection glass that is used for the marks of images and edges applied in the construction, photographs and with excellent properties to be used in the photovoltaic cells and solar heat.

DETAILED DESCRIPTION OF THE INVENTION

Figure 1:
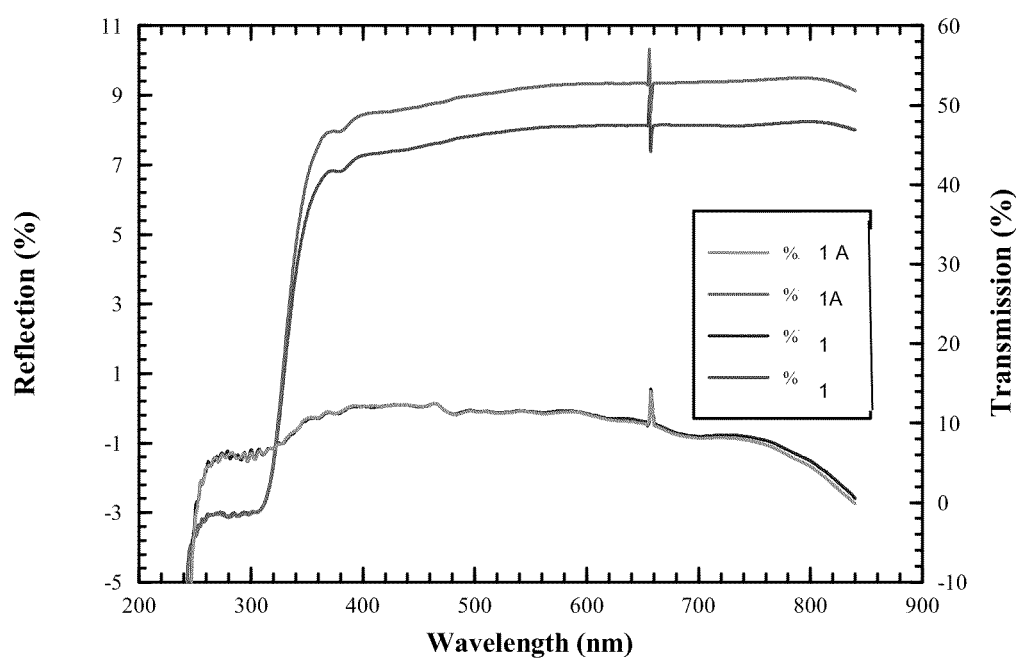
FIGS. 1 and 2 are graphic representations of Transmittance (%) and Reflectance (%) respectively of the samples 1, 1A, 2 and 2A of the present invention, in values of wavelength in accordance with one embodiment of the present invention.
Figure 2:
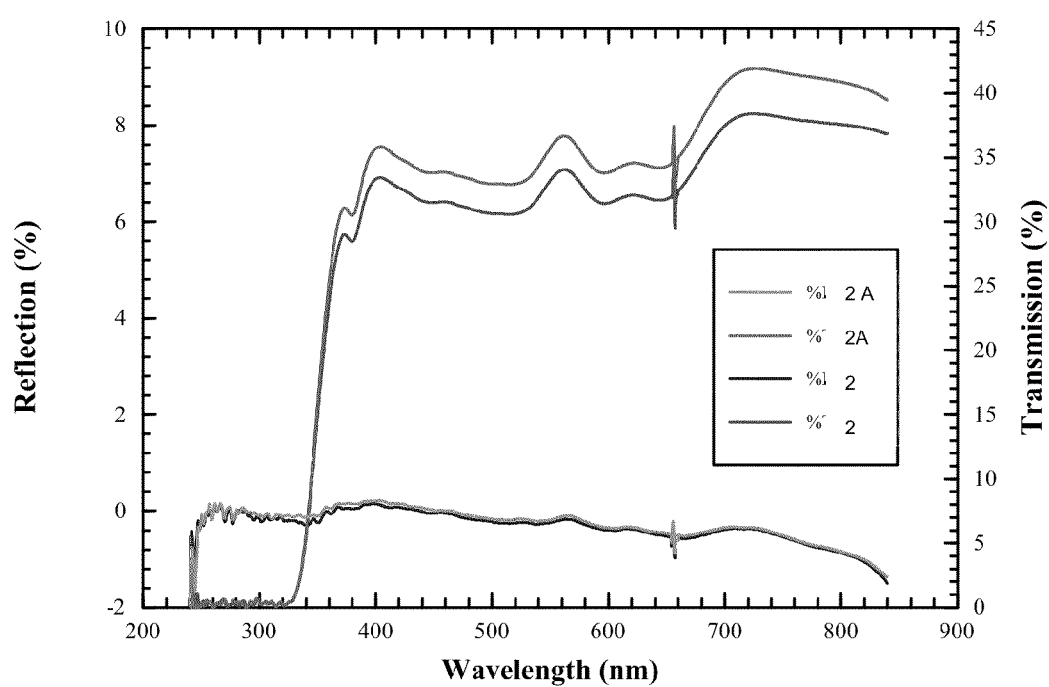
Figure 3:
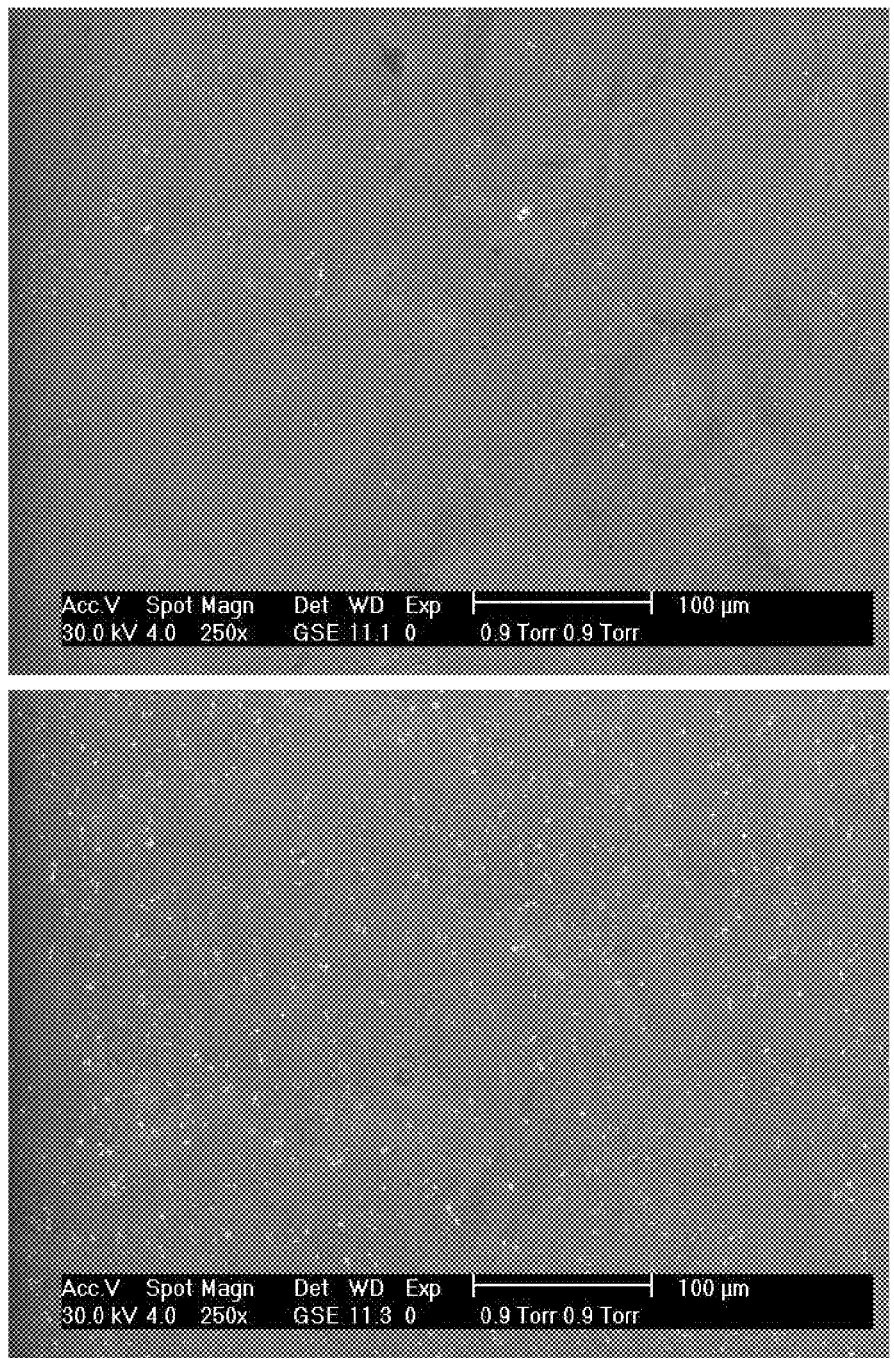
FIGS. 3 and 4 are photographic representations of the measurements that were realized in a scanning electron micrograph, of samples 1, 1A, 2 and 2A respectively of the present invention, in which a smooth and smooth tact is observed, with an aspect that does not reflect light and pleasant at sight in accordance with one embodiment of the present invention.
Figure 4:
Figure 4:
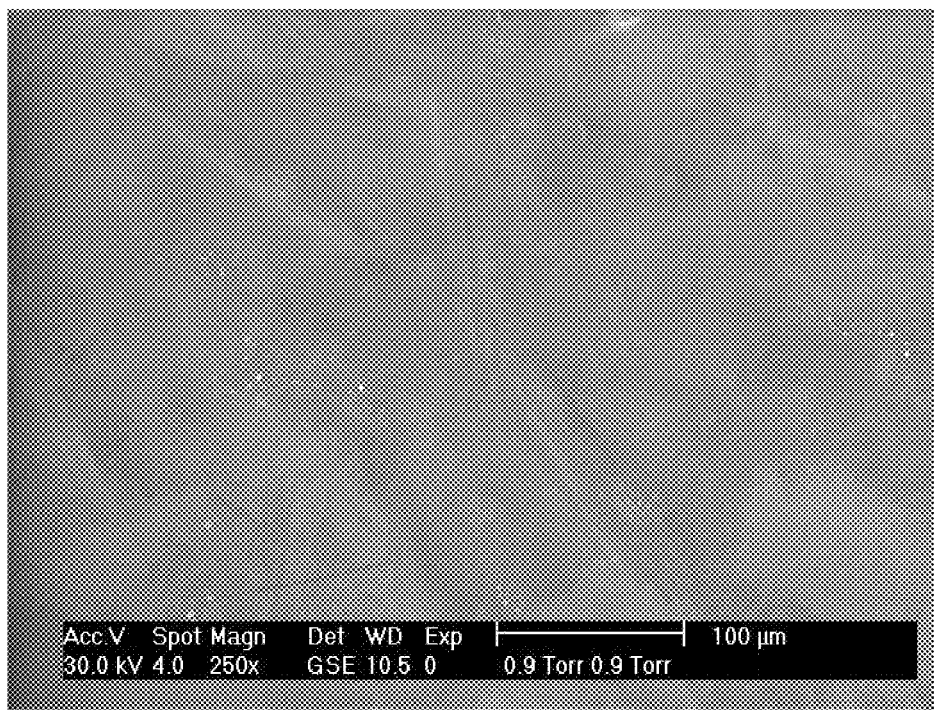
Figure 5:
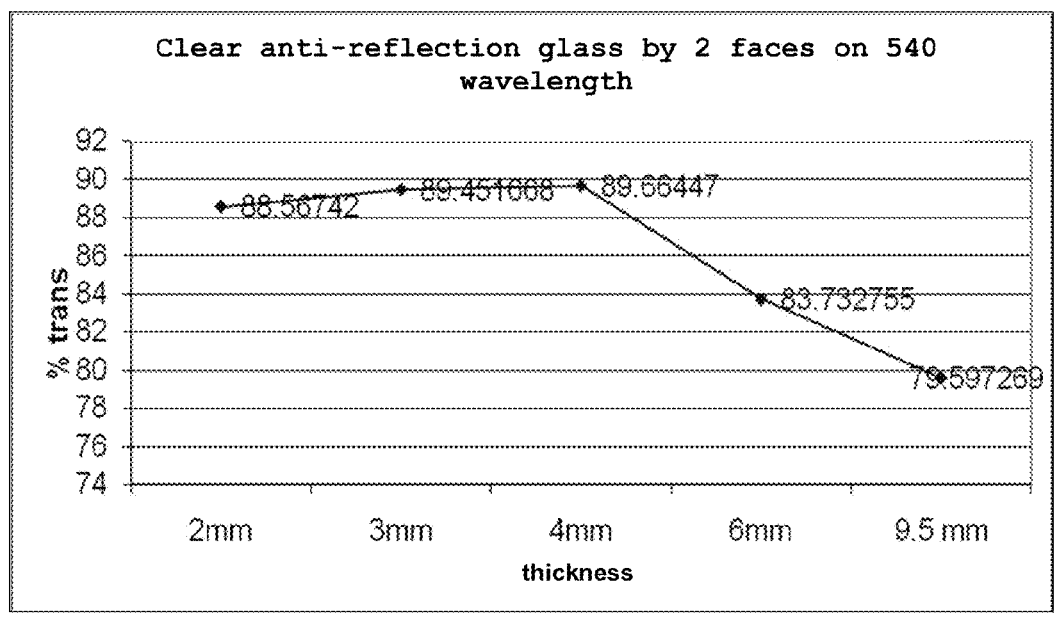
FIG. 5 is a graphic representation of the variation of % of transmittance, to a wavelength of 540 of a clear anti-reflection glass by its two faces to different thicknesses 2, 3, 4, 6 and 9.5 mm respectively in accordance with one embodiment of the present invention.
Figure 6:
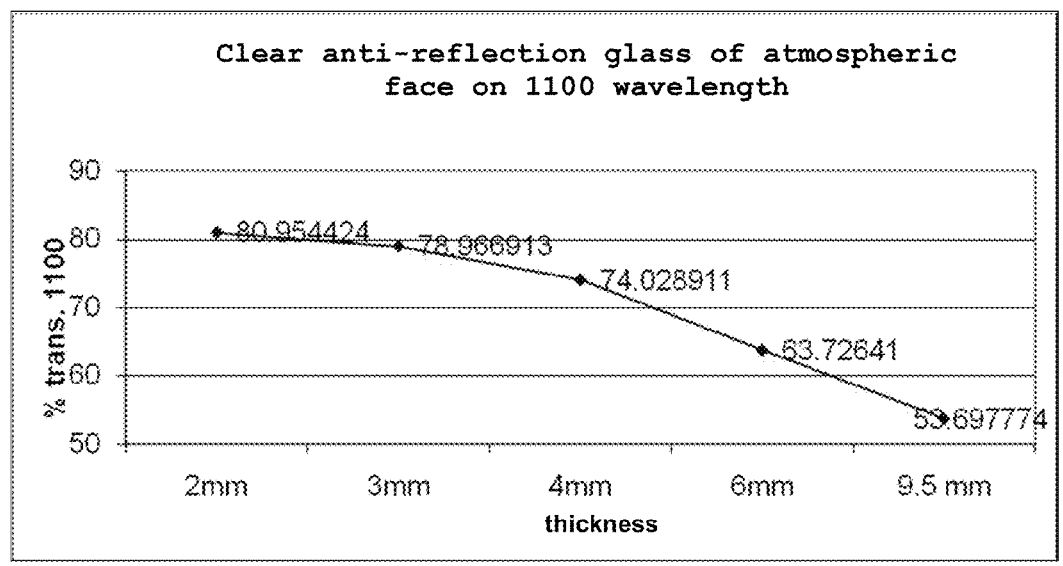
FIG. 6 is a graphic representation of the variation of % of transmittance, to a wavelength of 1100 of clear anti-reflection glass by its atmospheric face to different thicknesses in accordance with one embodiment of the present invention.
Figure 7:
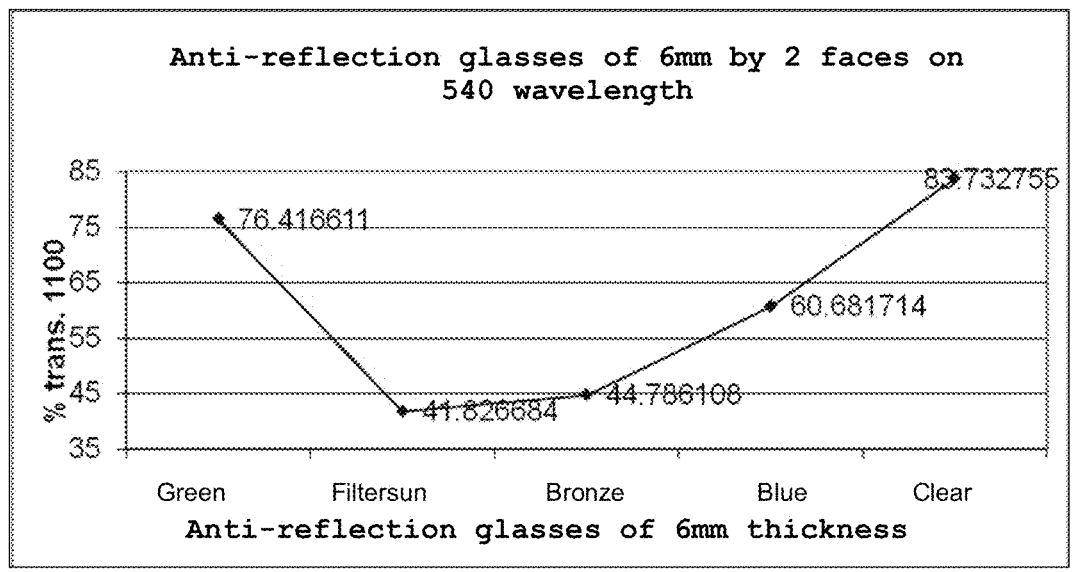
FIG. 7 is a graphic representation of the variation of % of transmittance, to a wavelength of 540 of different anti-reflections glasses by its two faces from a thickness of 6 mm in accordance with one embodiment of the present invention.
Figure 8:
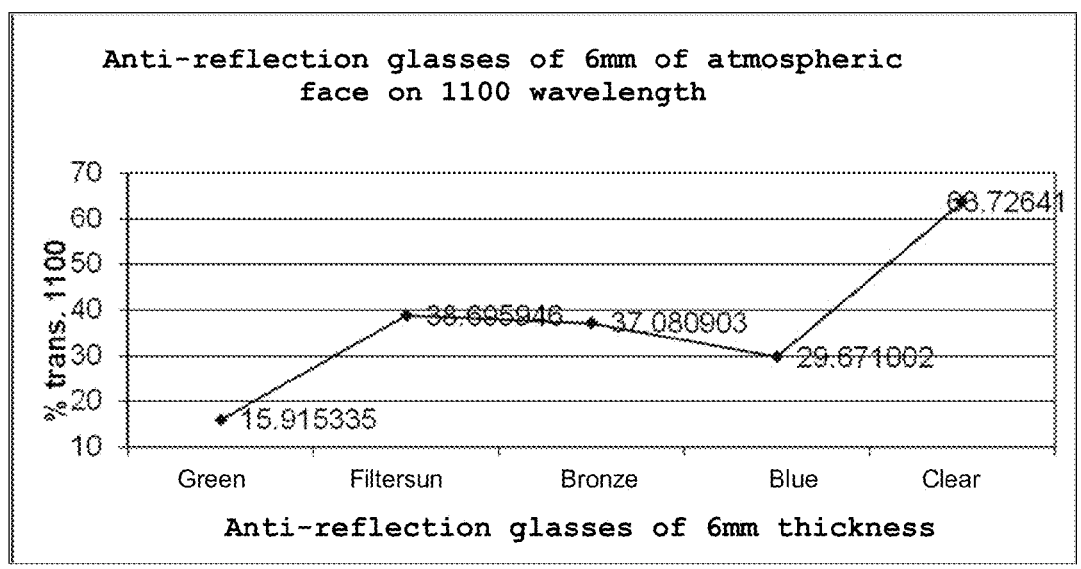
FIG. 8 is a graphic representation of the variation of % of transmittance, to a wavelength of 1100 of different anti-reflections glasses by its atmospheric face from a thickness of 6 mm in accordance with one embodiment of the present invention.
Figure 9:
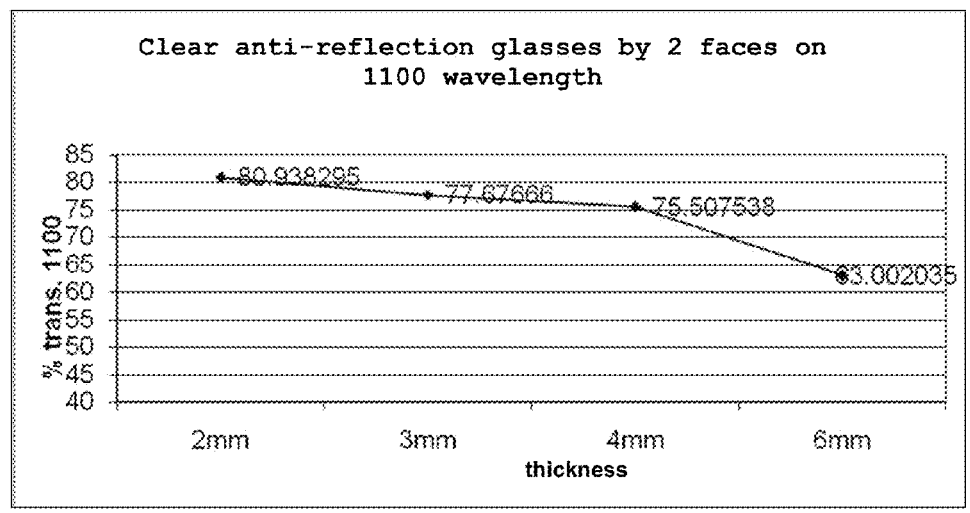
FIG. 9 is a graphic representation of the variation of % of transmittance, to a wavelength of 1100 of clear anti-reflection glass by its two faces to different thicknesses in accordance with one embodiment of the present invention.
Figure 10:
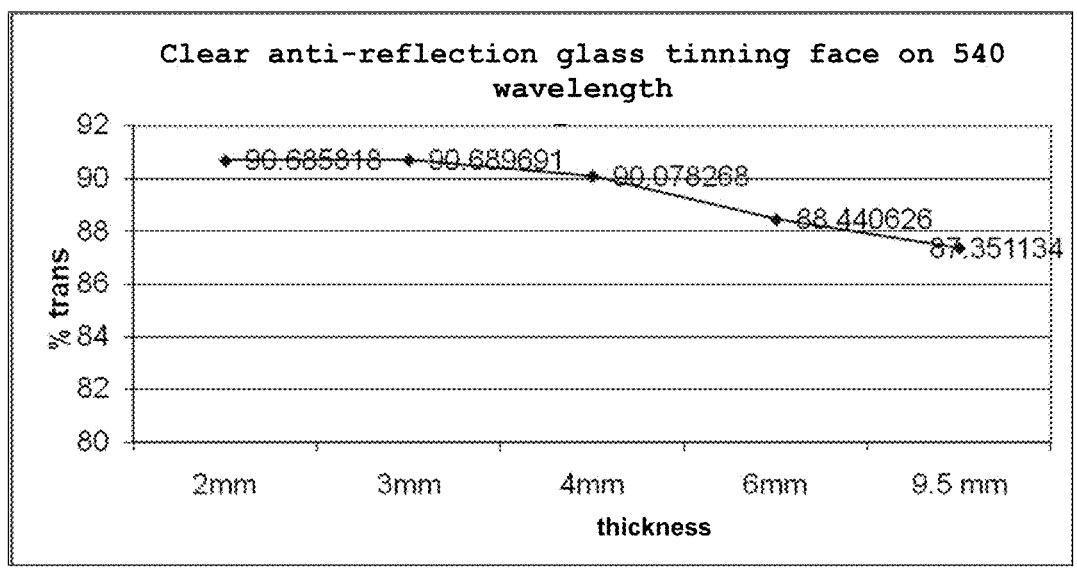
FIG. 10 is a graphic representation of the variation of % of transmittance, to a wavelength of 540 of anti-reflection glass by its tinning face to different thicknesses in accordance with one embodiment of the present invention.
Figure 11:
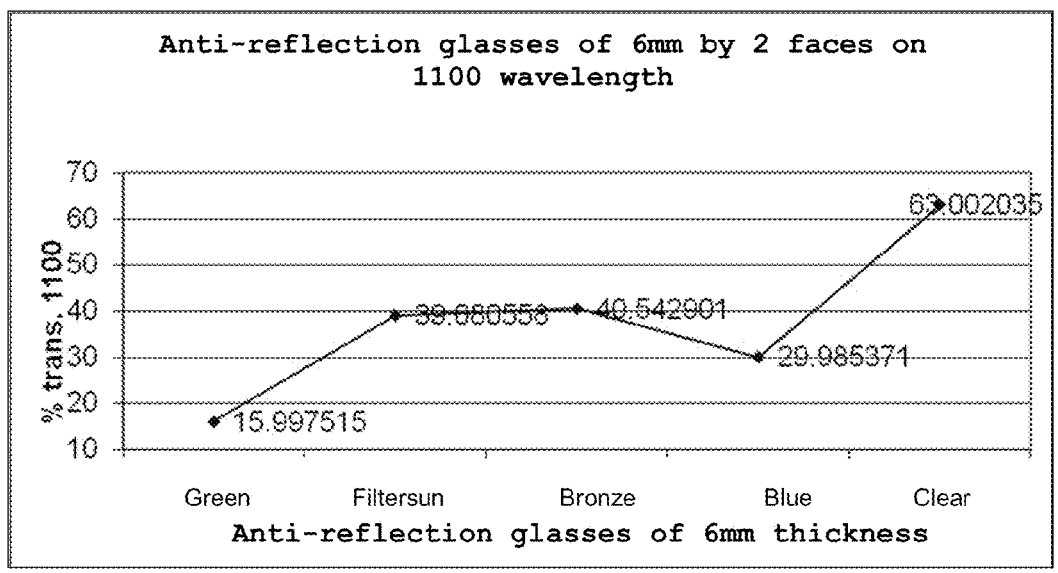
FIG. 11 is a graphic representation of the variation of % of transmittance, to a wavelength of 1110 of different anti-reflections glasses by its two faces from a thickness of 6 mm in accordance with one embodiment of the present invention.
Figure 12:
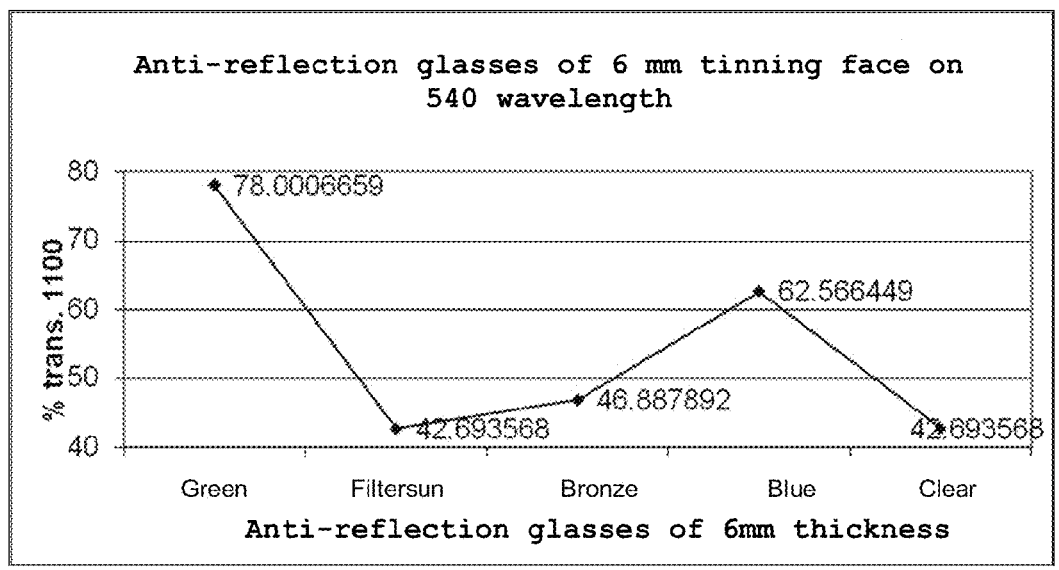
FIG. 12 is a graphic representation of the variation of % of transmittance, to a wavelength of 540 of different anti-reflections glasses by its tinning face from a thickness of 6 mm in accordance with one embodiment of the present invention.
Figure 13:
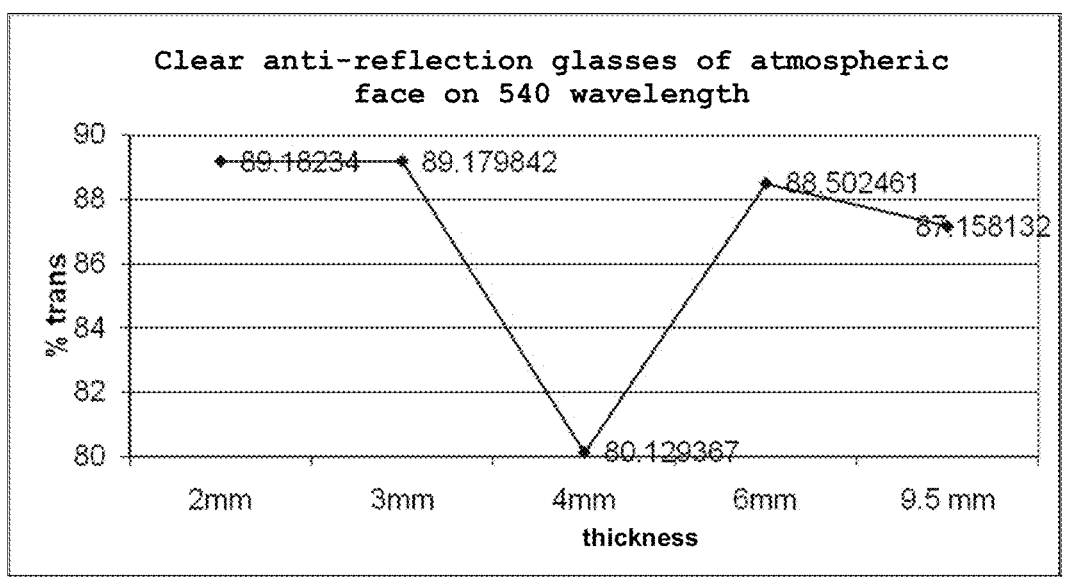
FIG. 13 is a graphic representation of the variation of % of transmittance, to a wavelength of 540 of clear anti-reflection glass by its atmospheric face to different thicknesses in accordance with one embodiment of the present invention.
Figure 14:
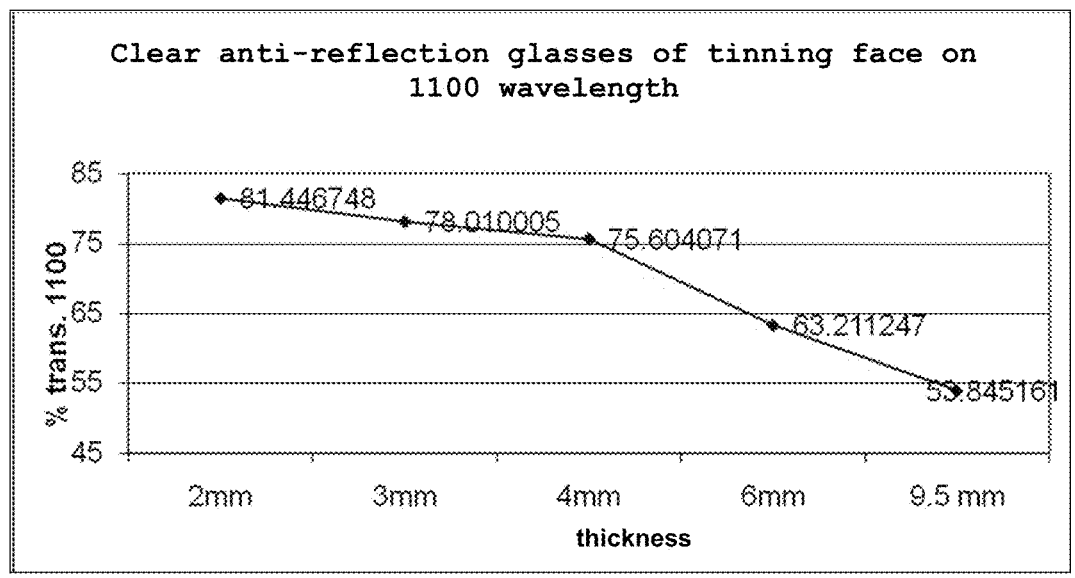
FIG. 14 is a graphic representation of the variation of % of transmittance, to a wavelength of 1100 of clear anti-reflection glass by its tinning face to different thicknesses in accordance with one embodiment of the present invention.
Figure 15:
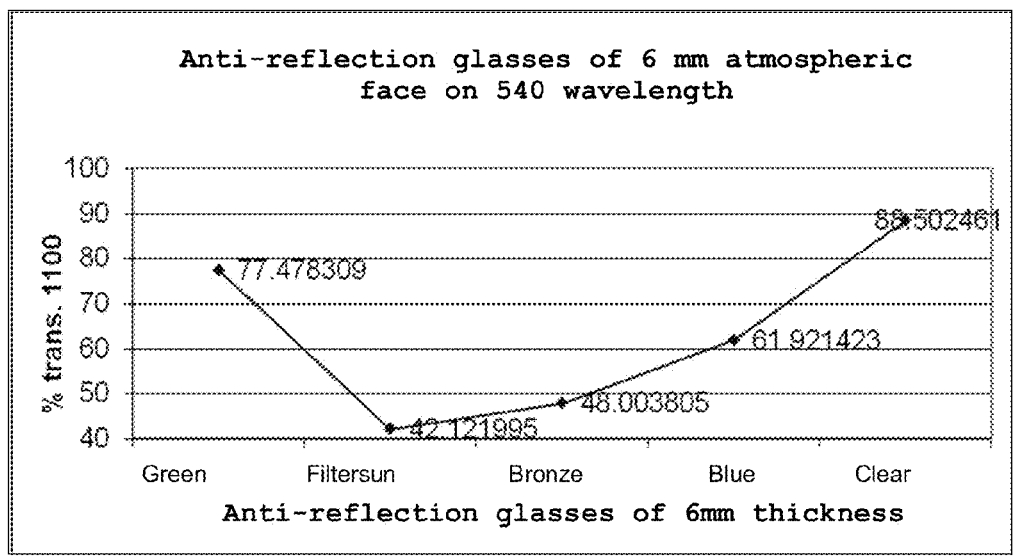
FIG. 15 is a graphic representation of the variation of % of transmittance, to a wavelength of 540 of different anti-reflections glasses by its atmospheric face from a thickness of 6 mm in accordance with one embodiment of the present invention.
Figure 16:
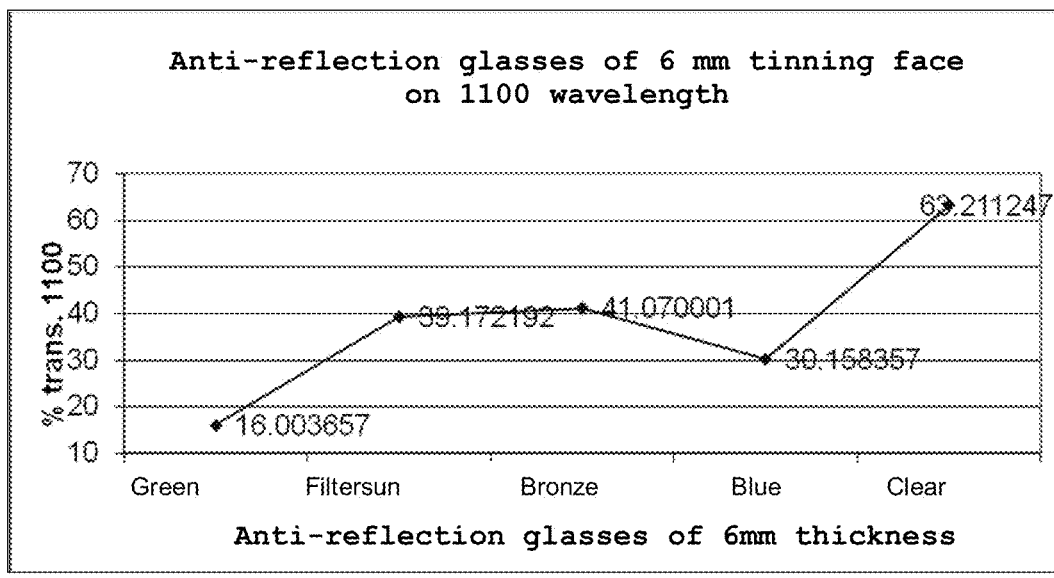
FIG. 16 is a graphic representation of the variation of % of transmittance, to a wavelength of 1100 of different anti-reflections glasses by its tinning face from a thickness of 6 mm in accordance with one embodiment of the present invention.
Figure 17:
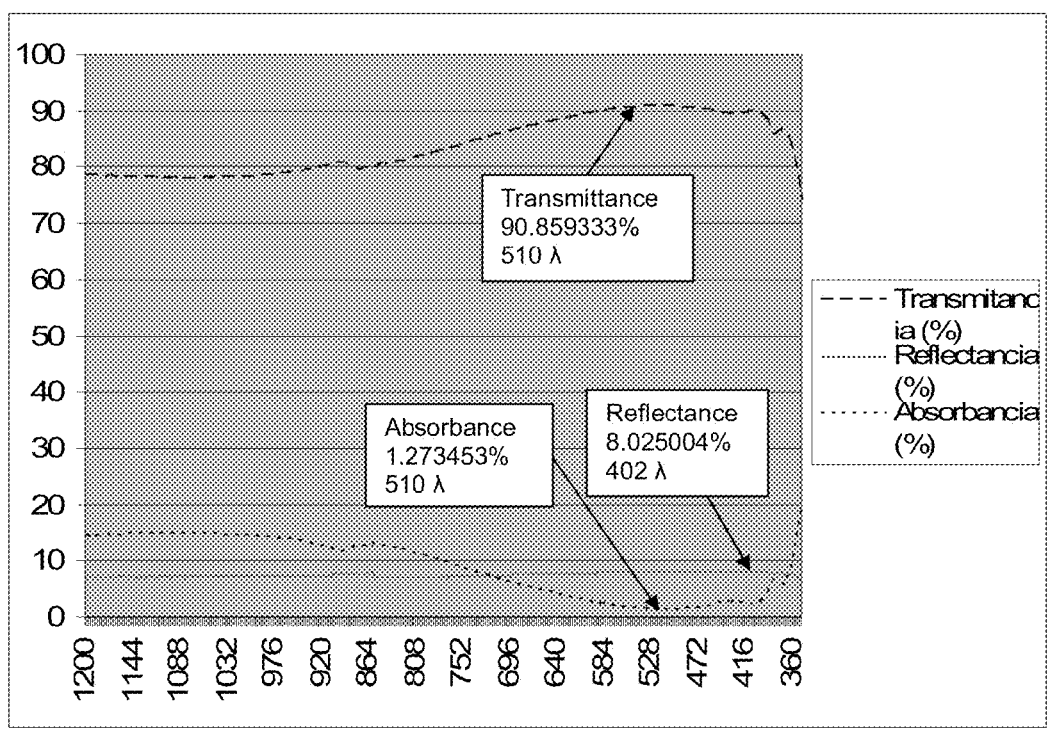
FIGS. 17 to 35, respectively represent the graphic of transmittance, absorbance and reflectance of examples 1 to 19 of anti-reflection glass according to various embodiments of the present invention, in values of wavelength (values of 350, 352, 354 increasing values of 2 in two until 1200 and values of 0 to 100 in the other axis of the graph).
Figure 18:
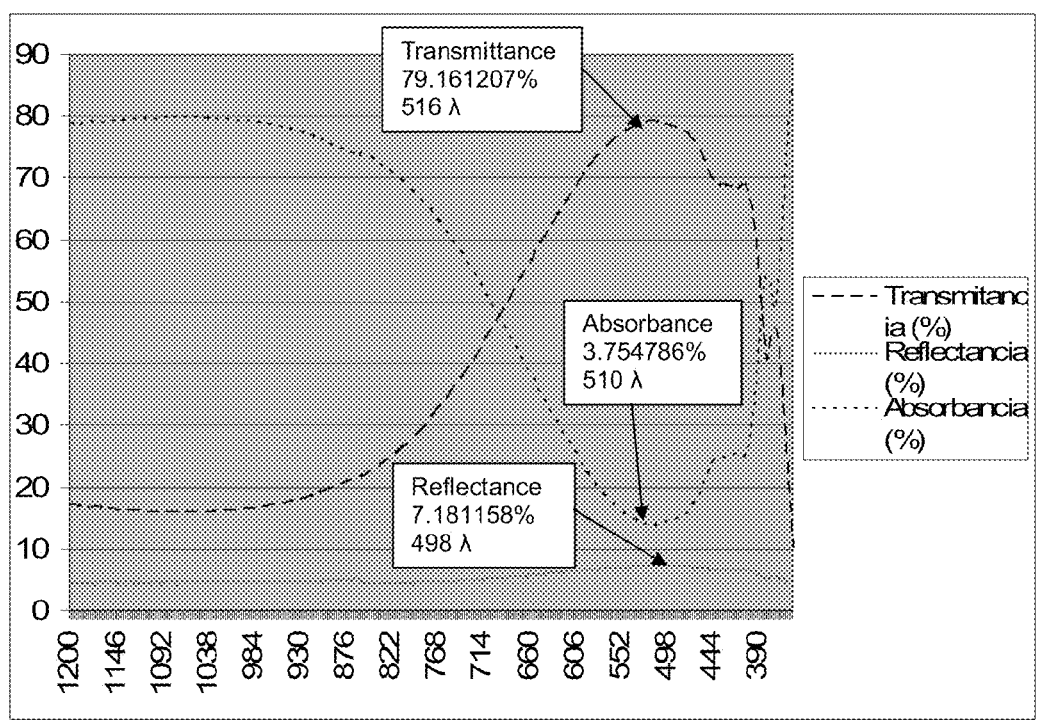
Figure 19:
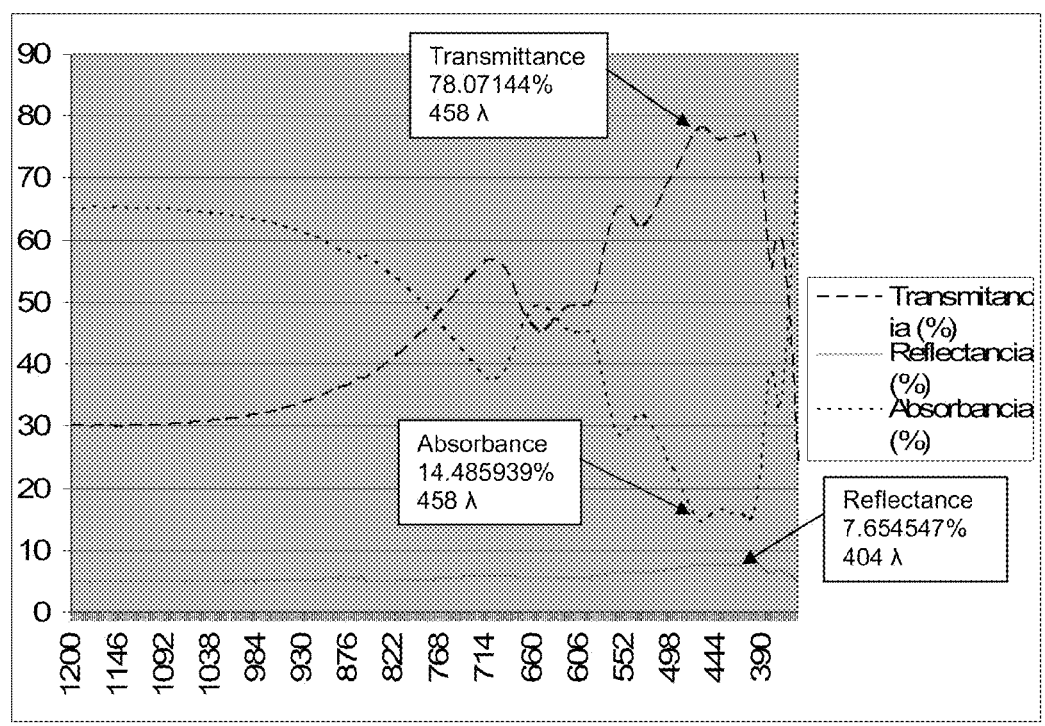
Figure 20:
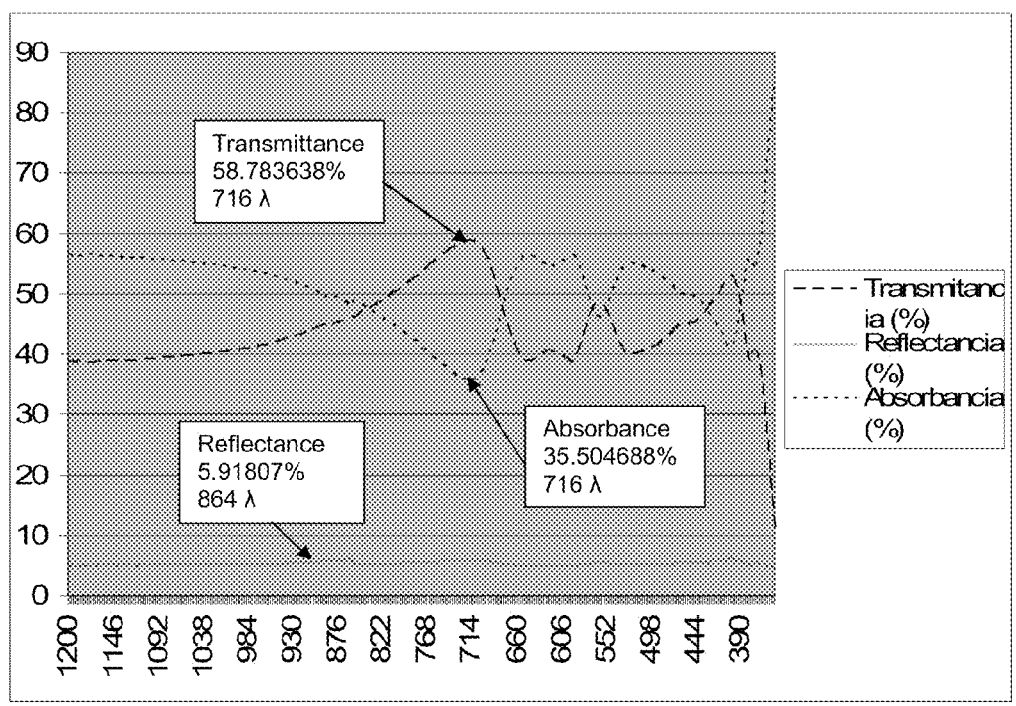
Figure 21:
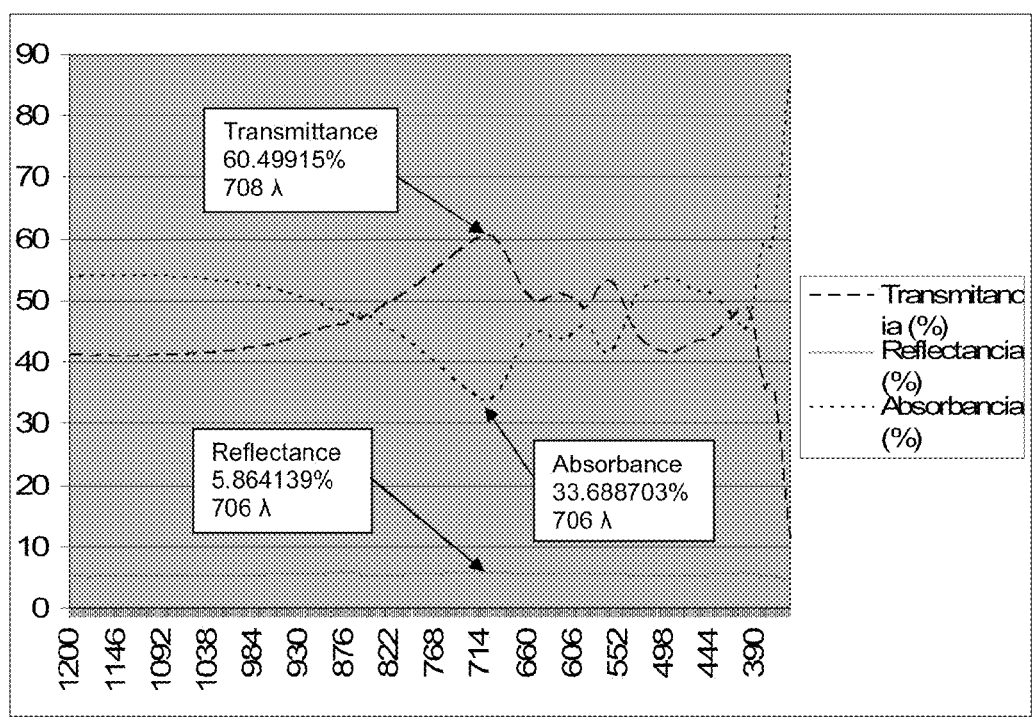
Figure 22:
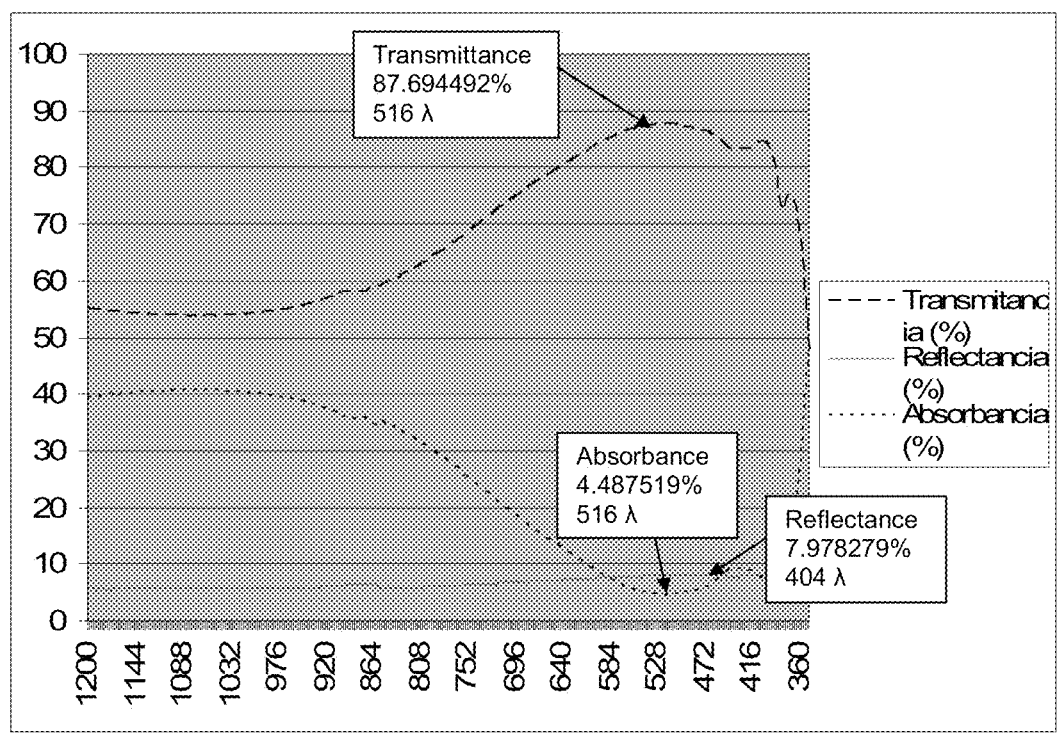
Figure 23:
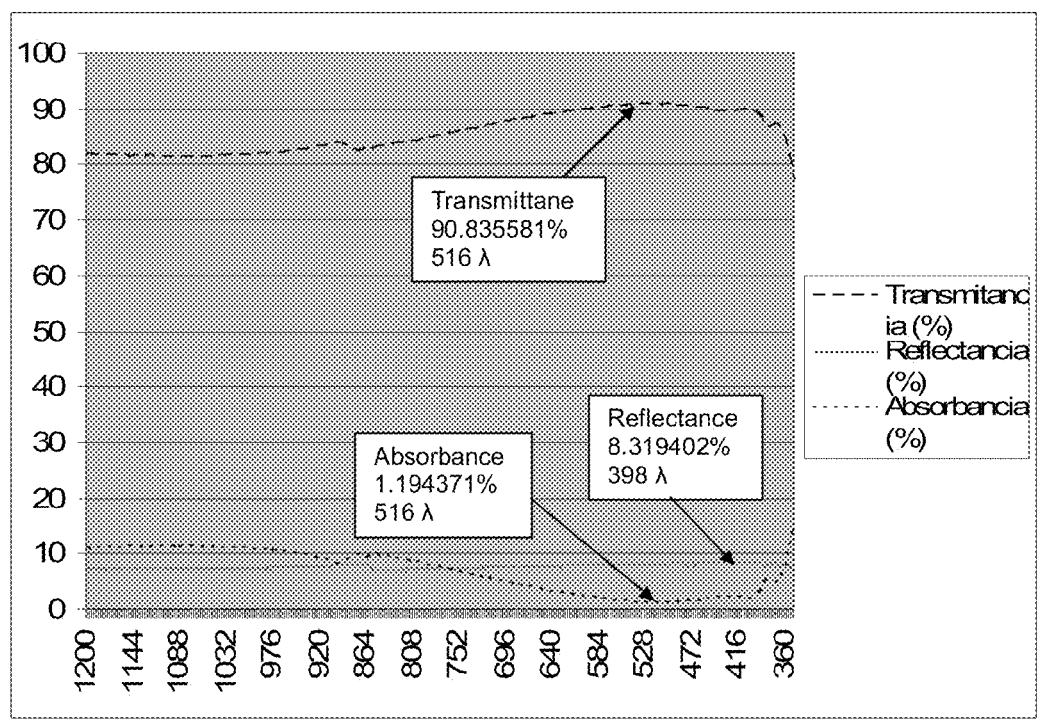
Figure 24:
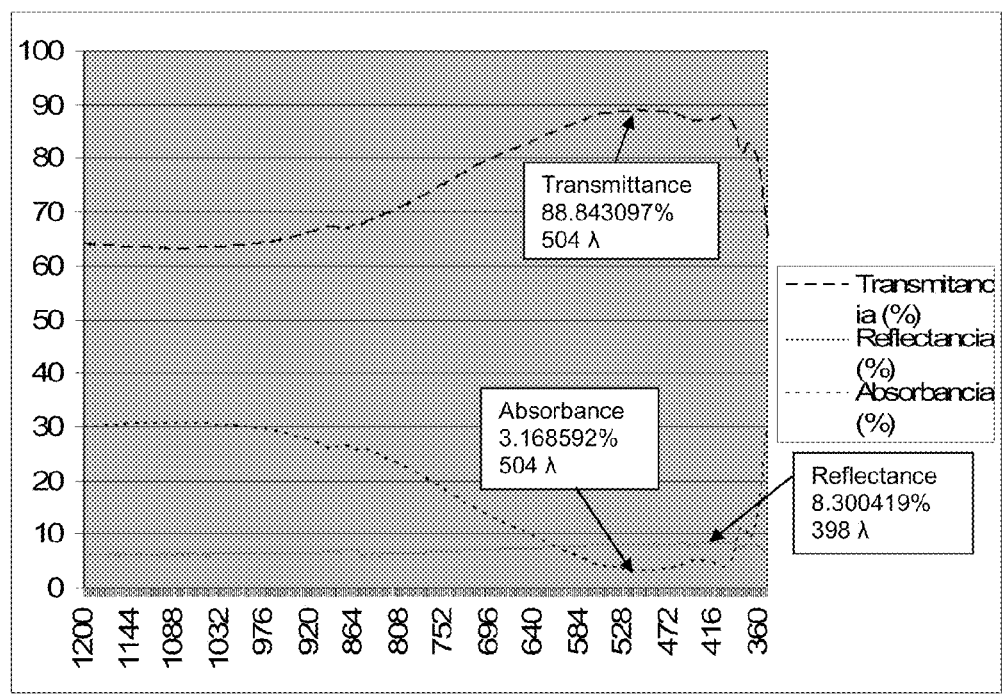
Figure 25:
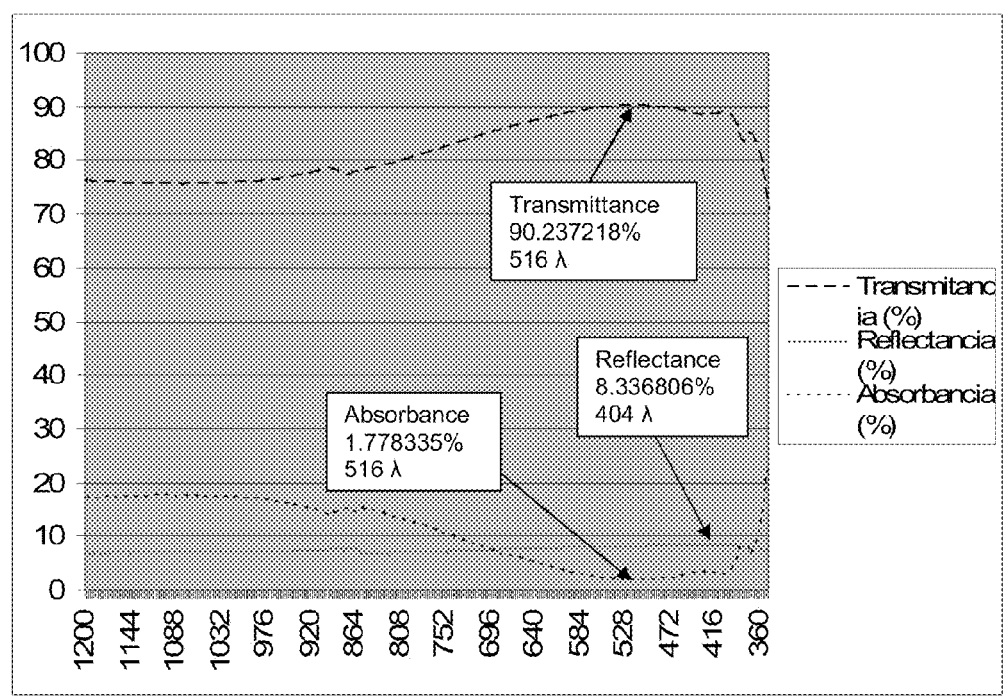
Figure 26:
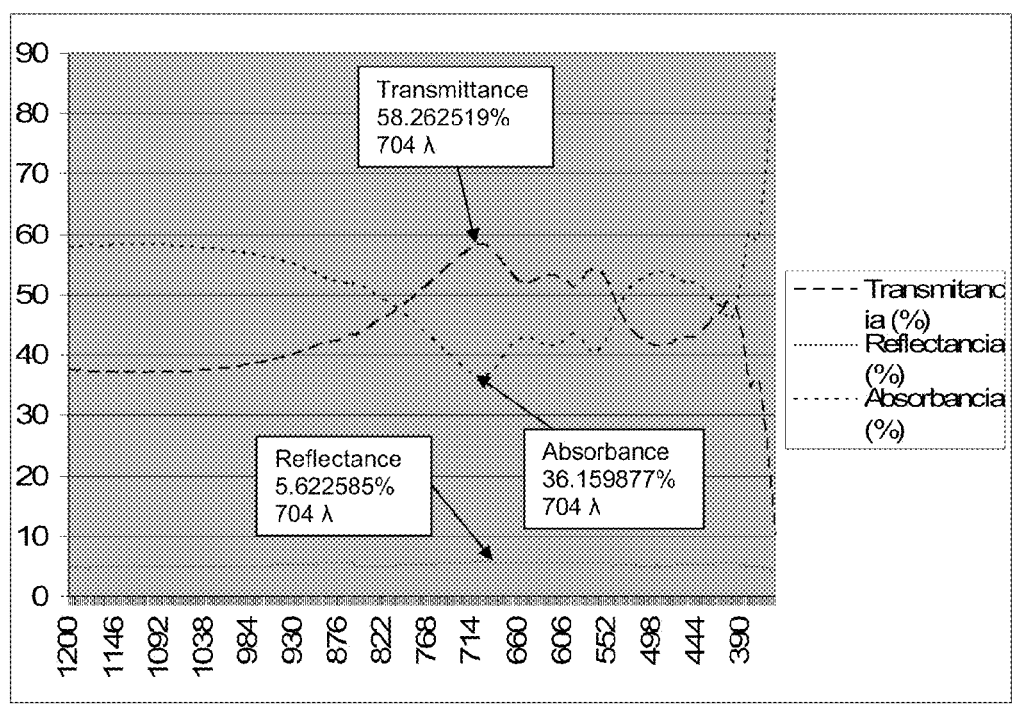
Figure 27:
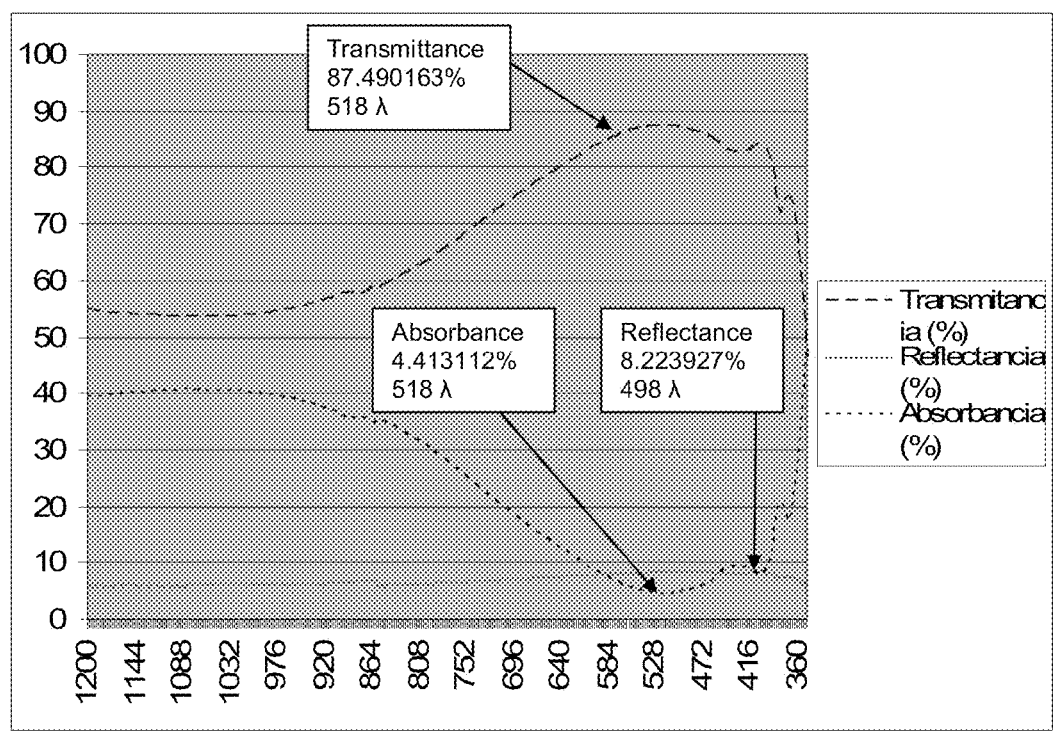
Figure 28:
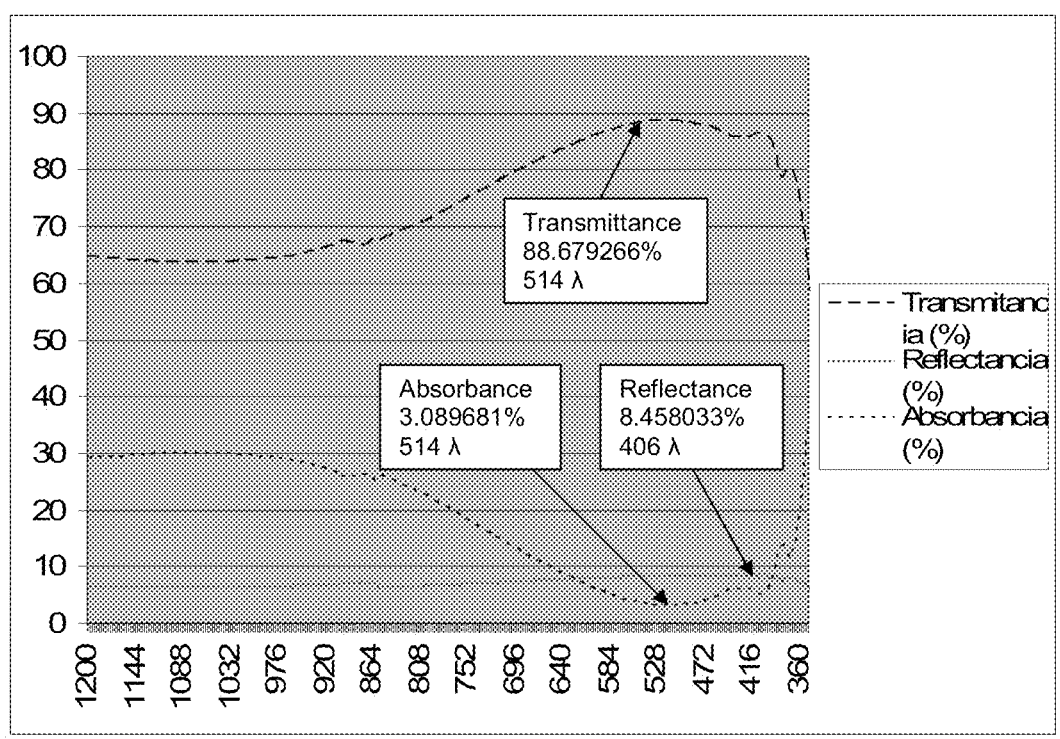
Figure 29:
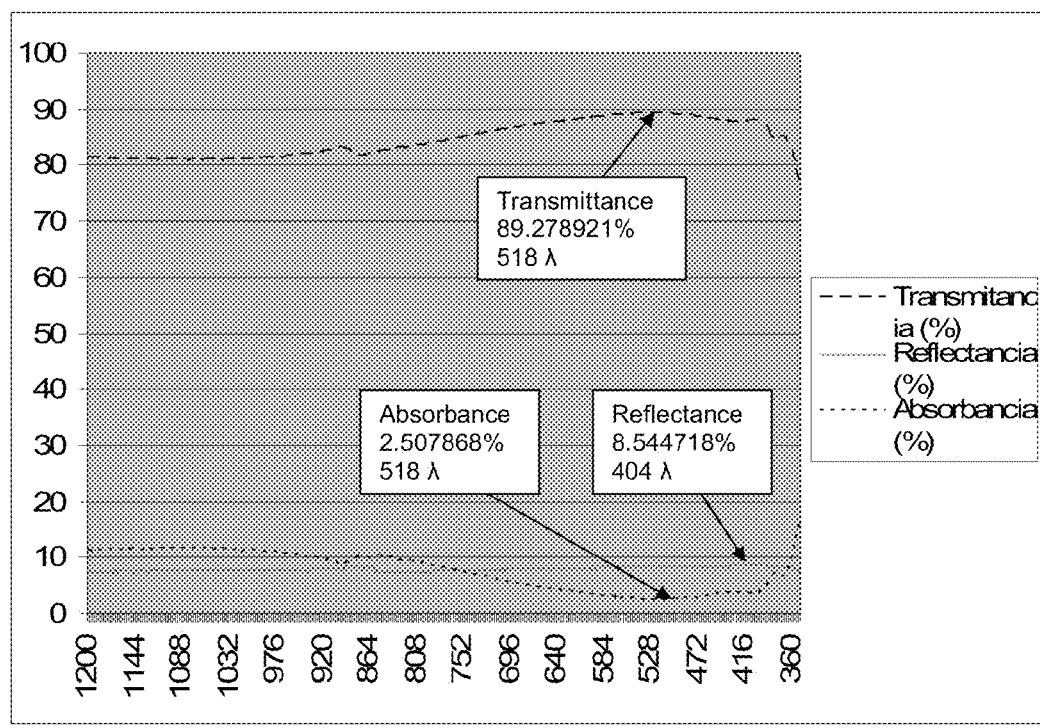
Figure 30:
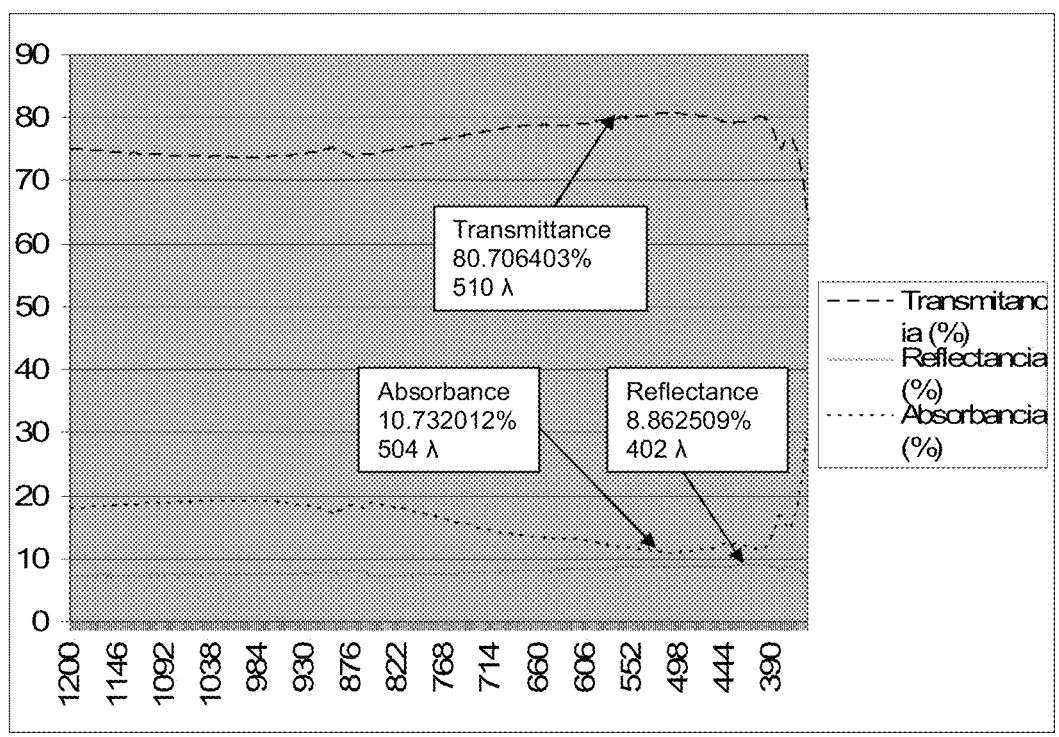
Figure 31:
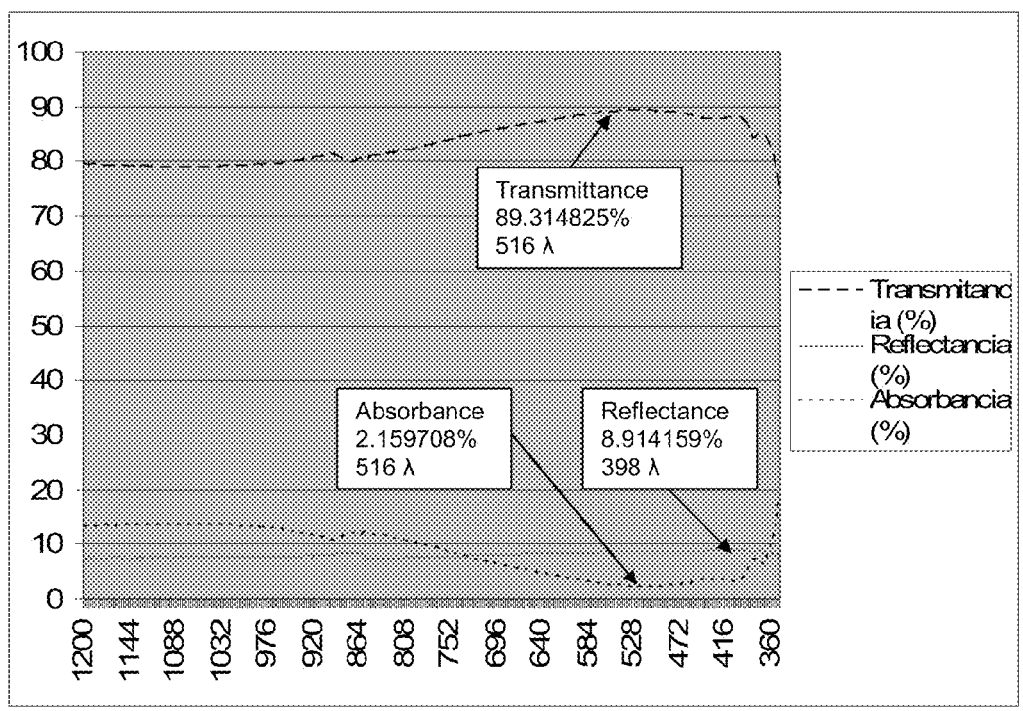
Figure 32:
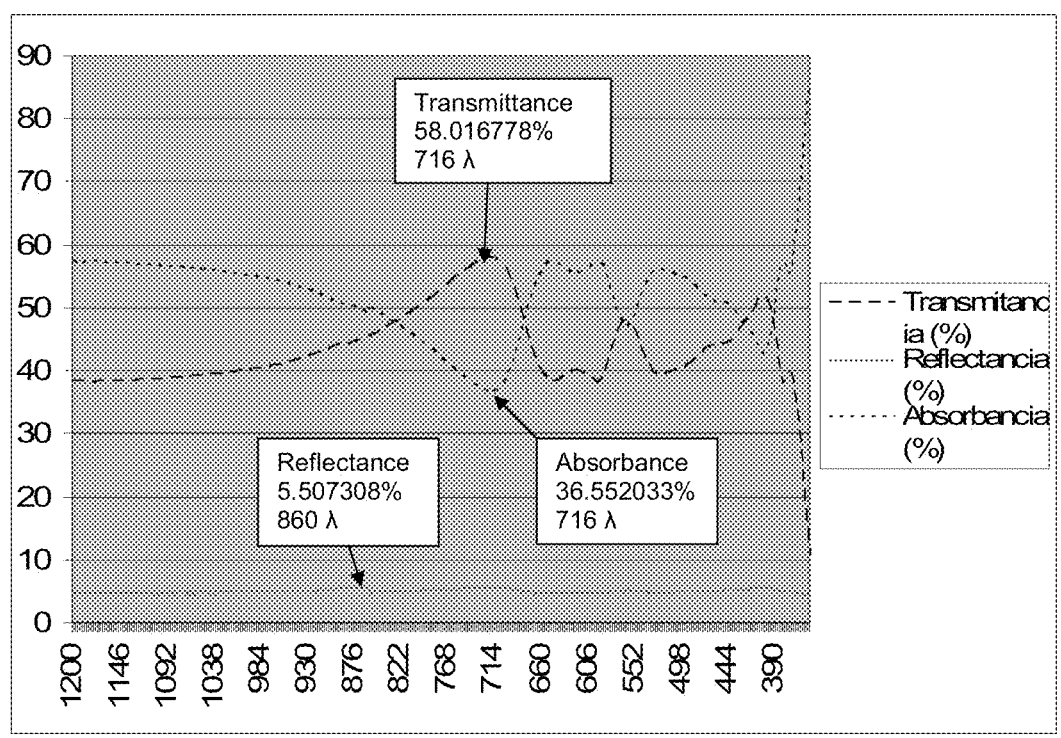
Figure 33:
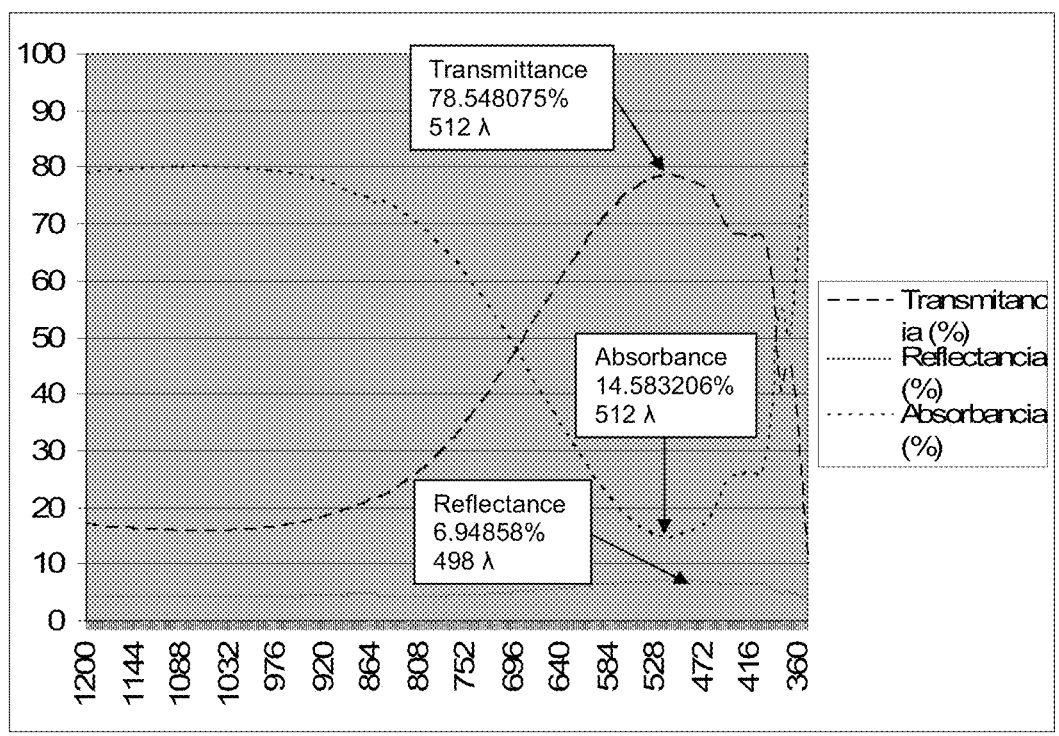
Figure 34:
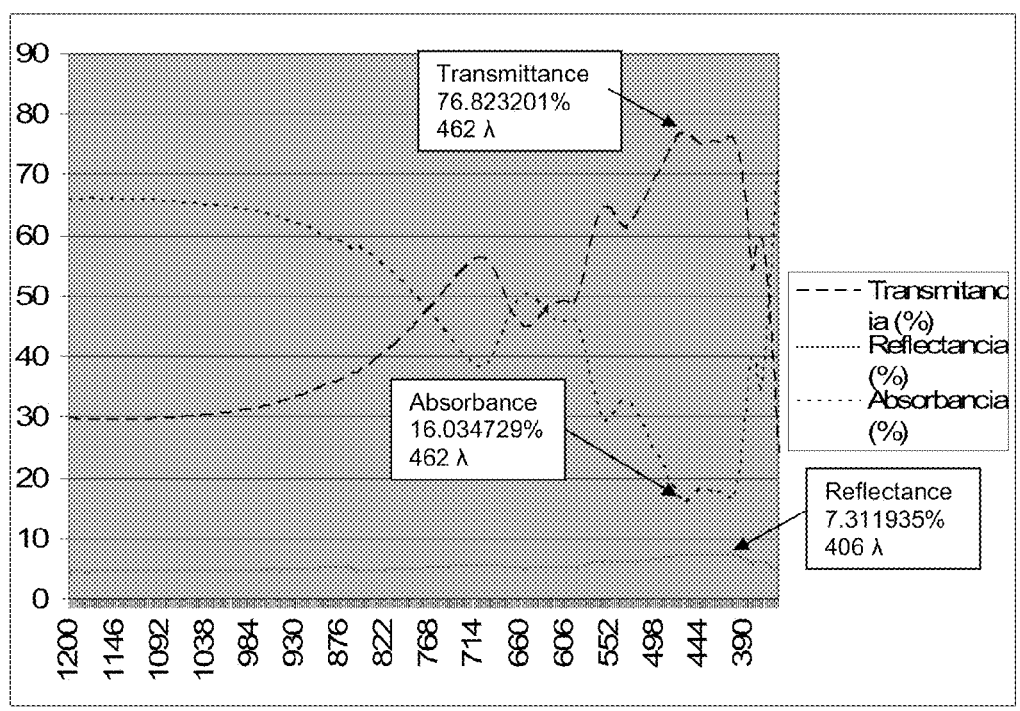
Figure 35:
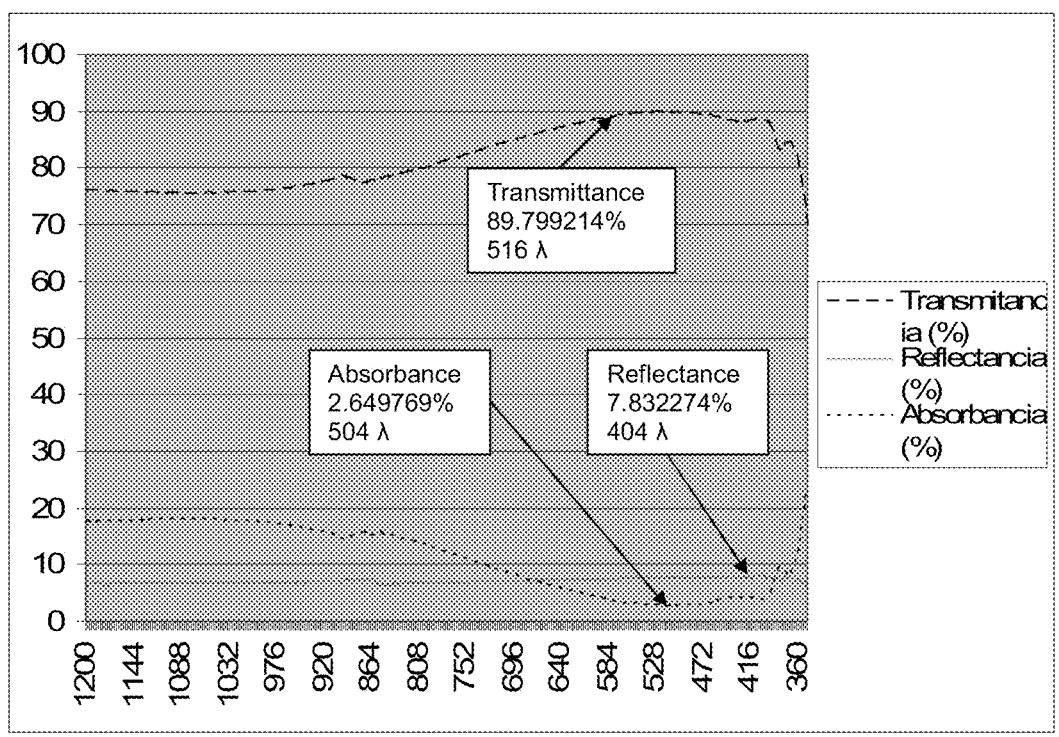

The present invention relates to an anti-reflection glass, of a smooth and smooth tact, with an aspect that does not reflect light and pleasant at sight. With defined values of transmittance, absorbance, reflectance, roughness and a series of micrographs realized with a microscope of atomic force to see the morphology and structure of the anti-reflection glass, by one or both faces, in partial or total form, produced by the process of patent MX 258792, by immersion in acid solution for simultaneous and continuous production.

The anti-reflection glass by one or both faces, in partial or total form, is obtained from sheet of flat glass of the any thickness, color and size of glass sheet.

The characteristics of the anti-reflection glass of the present invention surpass to the anti-reflection glass sheets produced by other methods and whose anti-reflection treatment can only be done by one of the faces of the glass sheet.

The sheets of flat glass that are used, been complete sheets of the commercial sizes from 180×160 cm, to 3600×2600 cm, including special measures and thicknesses that go from 2 mm to 19 mm, as well as different colors of glass that are transparent, green, gray, blue, brown, filtersun etc., whose anti-reflection treatment is made in one face (indifferently tinning face or atmospheric face), or simultaneously in both faces, in total form (all the face or faces of the glass sheet) or partial (like figures, engravings, rays, etc.) obtaining an anti-reflection finished very uniform in comparison with the unequal finished by a single face by other methods and in addition obtaining a lower cost.

To the anti-reflection glass by one or both faces, in partial or total form, of the present invention were realized several tests of transmittance, absorbance, reflectance, roughness and a series of micrographs realized with a microscope of atomic force to see the morphology and structures of the anti-reflection glass.

In the following table, are showed the samples of anti-reflection glass to which the tests of transmittance, absorbance, reflectance, and roughness were realized and a series of micrographs realized with a microscope of atomic force to see the morphology and structure of the anti-reflection glass of the present invention.

TABLE A

Identification of characterized samples

| Sample # | Face where the measurement was taken | | Type of glass |
|---|---|---|---|
| | Tinning | Atmospheric | |
| 1 | | X | Clear 2 mm anti-reflection by both faces |
| 1A | X | | |
| 2 | | X | Filtersun 3 mm anti-reflection by both faces |
| 2A | X | | |

Roughness

The measurements of roughness were realized with a 100 equipment TR "Surface Roughness Tester", marks TIME. The roughness parameters were: Ra, roughness average, and Rz, average roughness.

Method of Measurement A

In each one of the samples three measurements were realized (a, b and c), as it is indicated next:

| Sample | | |
|---|---|---|
| a | b | c |

In the following table 1 are showed the results of the roughness of the anti-reflection glass samples, Ra and Rz of the present invention in (µM).

TABLE 1

Measures of Roughness in glasses: Ra and Rz

| Simple # | Roughness (µM) | | | | | |
|---|---|---|---|---|---|---|
| | Ra | | | Rz | | |
| 1 | 0.47 | 0.52 | 0.50 | 2.7 | 2.8 | 2.6 |
| 1A | 0.50 | 0.57 | 0.476 | 2.7 | 3.6 | 3.3 |
| 2 | 0.68 | 0.9 | 0.75 | 4.5 | 4.2 | 5.3 |
| 2A | 0.62 | 0.77 | 0.59 | 3.6 | 4.7 | 4.8 |

Method of Measurement B

The larger sample denominated great glass and the other sample small glass; the faces were called A and B. It was taken five measurements from each side, in each one of the samples.

The measurements were done throughout each one of the samples, considering that this measurement fell in center of the sample.

Transmission (Infrared Near)

It was used a spectrophotometer of the transformed Infrared with of Fourier (FTIR) Perkin Elmer GX, the measurements were realized in the region of the near infrared (NIR) by both faces and by the technique of transmission (% T).

In following Table 2 are showed the results of transmission (Infrared Near) of the anti-reflection glass samples

TABLE 2

Transmission (Near Infrared)

| Sample # | Wavelength (cm$^{-1}$) | % T |
|---|---|---|
| 1 | 5909 | 83.2 |
| 1A | 4699 | 82.5 |
| 2 | 4182 | 73.5 |
| 2A | 4182 | 73.3 |

Reflectance and Transmittance

The measurements became to normal incidence in the spectral interval of 240-840 nm (UV-Vis) with the equipment FilmTek Metric tm 3000. The equipment was calibrated taking like maximum reflectance a wafer from polished silicon and like maximum transmittance the one from the air. The area that measures the equipment is the point of one millimeter of diameter.

In following table 3 are showed the measurements of Reflectance and Transmittance (542 nm) of the anti-reflection glass sample.

TABLE 3

| Reflectance and transmittance (542 nm) | |
|---|---|
| Sample # | % T |
| 1 | 9.0 |
| 1A | |
| 2 | 8 |
| 2A | |

*** The values are the same for both faces

Morphology

The measurements were realized in a scanning electron micrograph, the results are observed in the photographies of sample 1, 1A, 2 and 2A to them, in which a homogenous morphology is observed, without spots, with a homogenous roughness throughout the sample, the resulting anti-reflection glass of a smooth and smooth tact, with an aspect that does not reflect light and pleasant at sight.

The following examples have the purpose of illustrating the invention, not to limit it, any variation by the experts in the technique, fall within the reach of the same.

EXAMPLES

Different anti-reflection glasses are produced by one or both faces, in partial or total form, produced by the process described in patent MX 258792, the resulting anti-reflection glass has a smooth and smooth tact, with an aspect that does not reflect light and pleasant at sight.

The chemical process to produce float glass anti-reflection total or partial, by one or both faces of float glass for the simultaneous and continues production of one or several pieces and/or sheets by immersion in acid solution comprises the following steps:

a) Reception of the pieces and/or glass sheets;
b) Load of the pieces and/or glass towards the containers;
c) Processing of the pieces and/or glass sheets by immersion, according to the following stages:
   i. Immersion in an acid solution for anti-reflection finished.
   ii. Immersion in running water to rinse and to clear the rest of the acid solution.
   iii. Immersion in a neutralizer solution with caustic soda that stops the chemical reaction of acid on the pieces and/or glass sheets and neutralizes the acids that are even present to assure the optimal anti-reflection finished.
   iv. Immersion in running water to rinse and later to wash by aspersion with desionizade water.
   v. Immersion in desionizade water to wash and to eliminate any acid sign or neutralizing solution that could be present.
   vi. Immersion (optional) that is had like reserve for any eventuality.
   vii. Immersion (optional) that is had like reserve for any eventuality.
d) Drying of the pieces and/sheets of glass; and
e) Unloading of the pieces and/or anti-reflection glass sheets of the container towards the rammer easel, for its storage, transports and distribution.

In step c) the processing of the pieces and/or glass sheets comprising the immersion by stages in the following solutions:

i)—Immersion in an acid solution for anti-reflection finished that contains from 8.4% to 15.4% of hydrofluoric acid, 14.4% to 17.4% of hydrochloric acid, 23% of sugar monohydrated dextrose, 7% of bifluoride of anhydrous ammonium and 40% of water, the speed of immersion is of 5.1 or 19.3 m/min and the time of immersion goes of 20 s to 185 s.

ii)—Immersion to rinse and to clear the rest of previous acid solution, which is realized by immersion in running water.

iii)—Immersion in a neutralizing solution with caustic soda (3.7 ml of liquid soda caustic to 50% peso/volume by liter of water) that stops the chemical reaction of acid on the pieces and/or glass sheet and neutralize the acids that are even one present to assure the optimal anti-reflection finished;

iv)—Immersion to rinse and to eliminate the rest of the previous acid solution, which is realized later by immersion in running water and by aspersion with desionizade water.

v)—Immersion in desionizade water to wash and to eliminate any acid sign or neutralizing solution that could be present;

vi)—Immersion (optional) in case of any eventuality or necessity can be of water or acid solution.

vii)—Immersion (optional) in case of any eventuality or necessity can be of water or acid solution.

In step d) the drying of the pieces and/of glass sheet is realized in a continuous dryer type tunnel operated with natural gas, gas L.P and/or electrical resistance, with internal ventilation without the quality of the glass to a temperature of 35 to 60° C. is affected during 2 to 3.5 hours.

Example 1

The obtained anti-reflection glass has the following properties:

| Clear anti-reflection glass of 3 mm tinning face | | | |
|---|---|---|---|
| Wavelength λ | Transmittance (%) | Absorbance (%) | Reflectance (%) |
| 1200 | 78.644133 | 14.393106 | 7.018912 |
| 768 | 83.34111 | 9.550472 | 7.165744 |
| 510 | 90.589333 | 1.273453 | 7.938662 |
| 402 | 89.847631 | 2.199590 | 8.025004 |
| 352 | 76.460312 | 16.718469 | 6.932133 |

These values are described in graphic the corresponding ones in which the respective curves of each type of anti-reflection glass of the present invention are observed.

Example 2

| Green anti-reflection glass of 6 mm tinning face | | | |
|---|---|---|---|
| Wavelength λ | Transmittance (%) | Absorbance (%) | Reflectance (%) |
| 1200 | 17.068445 | 78.630483 | 4.335758 |
| 516 | 79.161207 | 13.761383 | 7.141685 |
| 510 | 79.15717 | 13.754786 | 7.152416 |
| 498 | 78.625216 | 14.258256 | 7.181158 |
| 352 | 13.841152 | 81.682453 | 4.549182 |

Example 3

| Blue anti-reflection glass of 6 mm tinning face | | | |
|---|---|---|---|
| Wavelength λ | Transmittance (%) | Absorbance (%) | Reflectance (%) |
| 1200 | 30.174288 | 65.132958 | 4.730599 |
| 768 | 48.375286 | 46.316540 | 5.350982 |
| 458 | 78.07144 | 14.485939 | 7.510213 |
| 404 | 77.699684 | 14.714660 | 7.654547 |
| 352 | 29.433254 | 65.363094 | 5.288264 |

Example 4

| Filtersun anti-reflection glass of 6 mm tinning face | | | |
|---|---|---|---|
| Wavelength λ | Transmittance (%) | Absorbance (%) | Reflectance (%) |
| 1200 | 38.774117 | 56.414284 | 4.850402 |
| 864 | 45.942038 | 48.193155 | 5.91807 |
| 716 | 58.783638 | 35.504688 | 5.757736 |
| 498 | 41.058246 | 53.820837 | 5.167424 |
| 352 | 14.183768 | 81.218151 | 4.672847 |

Example 5

| Bronze anti-reflection glass of 6 mm tinning face | | | |
|---|---|---|---|
| Wavelength λ | Transmittance (%) | Absorbance (%) | Reflectance (%) |
| 1200 | 41.262608 | 53.780830 | 4.996534 |
| 708 | 60.49915 | 33.706325 | 5.841255 |
| 706 | 60.494071 | 33.688703 | 5.864139 |
| 402 | 49.160005 | 45.269163 | 5.621425 |
| 352 | 12.870009 | 82.616804 | 4.586572 |

Example 6

| Clear anti-reflection glass of 9.5 mm tinning face | | | |
|---|---|---|---|
| Wavelength λ | Transmittance (%) | Absorbance (%) | Reflectance (%) |
| 1200 | 55.076298 | 39.441680 | 5.526232 |
| 768 | 66.741681 | 27.193864 | 6.113362 |
| 516 | 87.694492 | 4.487519 | 7.88899 |
| 404 | 84.513273 | 7.580253 | 7.978279 |
| 352 | 51.676342 | 42.439453 | 5.979883 |

Example 7

| Clear anti-reflection glass of 2 mm tinning face | | | |
|---|---|---|---|
| Wavelength λ | Transmittance (%) | Absorbance (%) | Reflectance (%) |
| 1200 | 81.885837 | 10.989631 | 7.181988 |
| 768 | 85.370796 | 7.373423 | 7.314295 |
| 516 | 90.835581 | 1.194371 | 8.04243 |
| 398 | 89.667071 | 2.146637 | 8.319402 |
| 352 | 79.431544 | 13.043682 | 7.647128 |

Example 8

| Clear anti-reflection glass of 6 mm tinning face | | | |
|---|---|---|---|
| Wavelength λ | Transmittance (%) | Absorbance (%) | Reflectance (%) |
| 1200 | 63.958581 | 30.027753 | 6.062163 |
| 768 | 73.773534 | 19.721167 | 6.557761 |
| 504 | 88.843097 | 3.168592 | 8.060859 |
| 398 | 87.564652 | 4.267736 | 8.300419 |
| 352 | 67.679699 | 25.510774 | 6.920251 |

Example 9

| Clear anti-reflection glass of 4 mm tinning face | | | |
|---|---|---|---|
| Wavelength λ | Transmittance (%) | Absorbance (%) | Reflectance (%) |
| 1200 | 76.216851 | 17.078986 | 6.758229 |
| 768 | 81.68622 | 11.324317 | 7.04583 |
| 516 | 90.237218 | 1.778335 | 8.05696 |
| 404 | 88.85629 | 2.881935 | 8.336806 |
| 352 | 73.17317 | 19.645954 | 7.297638 |

Example 10

| Bronze anti-reflection glass of 6 mm atmospheric face | | | |
|---|---|---|---|
| Wavelength λ | Transmittance (%) | Absorbance (%) | Reflectance (%) |
| 1200 | 37.472047 | 57.807415 | 4.758607 |
| 768 | 51.474663 | 43.346415 | 5.220687 |
| 704 | 58.262519 | 36.159877 | 5.622585 |
| 404 | 48.875354 | 45.731472 | 5.442153 |
| 352 | 13.098763 | 82.597554 | 4.373662 |

Example 11

Clear anti-reflection glass of 9.5 mm atmospheric face

| Wavelength λ | Transmittance (%) | Absorbance (%) | Reflectance (%) |
|---|---|---|---|
| 1200 | 54.887018 | 39.388824 | 5.770321 |
| 768  | 66.592167 | 27.104402 | 6.354265 |
| 518  | 87.490163 | 4.413112  | 8.170257 |
| 498  | 87.059359 | 4.790729  | 8.223927 |
| 352  | 51.211671 | 42.897326 | 5.986792 |

Example 12

Clear anti-reflection glass of 6 mm atmospheric face

| Wavelength λ | Transmittance (%) | Absorbance (%) | Reflectance (%) |
|---|---|---|---|
| 1200 | 64.698742 | 29.136657 | 6.214316 |
| 768  | 73.644673 | 19.661713 | 6.747595 |
| 514  | 88.679266 | 3.089681  | 8.305805 |
| 406  | 86.547044 | 5.071045  | 8.458033 |
| 352  | 62.5142   | 30.889970 | 6.703079 |

Example 13

Clear anti-reflection glass of 2 mm atmospheric face

| Wavelength λ | Transmittance (%) | Absorbance (%) | Reflectance (%) |
|---|---|---|---|
| 1200 | 81.4349   | 11.274143 | 7.349755 |
| 768  | 84.661915 | 7.822142  | 7.576555 |
| 518  | 89.278921 | 2.507868  | 8.287801 |
| 404  | 87.951759 | 3.580425  | 8.544718 |
| 352  | 76.879695 | 15.395051 | 7.850868 |

Example 14

Clear anti-reflection glass of 4 mm atmospheric face

| Wavelength λ | Transmittance (%) | Absorbance (%) | Reflectance (%) |
|---|---|---|---|
| 1200 | 74.996719 | 17.883751 | 7.176946 |
| 510  | 80.706403 | 10.740950 | 8.63032  |
| 504  | 80.690959 | 10.732012 | 8.654923 |
| 402  | 80.070163 | 11.147091 | 8.862509 |
| 352  | 65.729735 | 26.756293 | 7.63615  |

Example 15

Filtersun anti-reflection glass of 6 mm atmospheric face

| Wavelength λ | Transmittance (%) | Absorbance (%) | Reflectance (%) |
|---|---|---|---|
| 1200 | 79.47698  | 13.201293 | 7.380773 |
| 768  | 83.230641 | 9.190861  | 7.639615 |
| 516  | 89.314825 | 2.159708  | 8.602893 |
| 400  | 87.886444 | 3.342024  | 8.914159 |
| 352  | 75.90081  | 16.212153 | 8.015281 |

Example 16

Filtersun anti-reflection glass of 6 mm atmospheric face

| Wavelength λ | Transmittance (%) | Absorbance (%) | Reflectance (%) |
|---|---|---|---|
| 1200 | 38.248152 | 57.283587 | 4.504295 |
| 860  | 45.57881  | 48.963448 | 5.507308 |
| 716  | 58.016778 | 36.552033 | 5.474989 |
| 404  | 51.759193 | 42.822717 | 5.467296 |
| 352  | 13.876504 | 81.989474 | 4.201242 |

Example 17

Green anti-reflection glass of 6 mm atmospheric face

| Wavelength λ | Transmittance (%) | Absorbance (%) | Reflectance (%) |
|---|---|---|---|
| 1200 | 16.929765 | 79.026302 | 4.076545 |
| 768  | 32.047922 | 63.659461 | 4.327235 |
| 512  | 78.548075 | 14.583206 | 6.931099 |
| 498  | 78.03792  | 15.076037 | 6.94858  |
| 352  | 13.633363 | 82.388043 | 4.043287 |

Example 18

Blue anti-reflection glass of 6 mm atmospheric face

| Wavelength λ | Transmittance (%) | Absorbance (%) | Reflectance (%) |
|---|---|---|---|
| 1200 | 29.716093 | 65.853502 | 4.466134 |
| 768  | 47.776695 | 47.201392 | 5.062412 |
| 462  | 76.823201 | 16.034729 | 7.206932 |
| 406  | 76.282492 | 16.471380 | 7.311935 |
| 352  | 29.00071  | 66.272025 | 4.804131 |

Example 19

| Clear anti-reflection glass of 4 mm by both faces | | | |
|---|---|---|---|
| Wavelength λ | Transmittance (%) | Absorbance (%) | Reflectance (%) |
| 1200 | 76.063514 | 17.498145 | 6.490263 |
| 516 | 89.799214 | 2.654473 | 7.614847 |
| 504 | 89.770216 | 2.649769 | 7.648855 |
| 404 | 88.509291 | 3.728925 | 7.832274 |
| 352 | 72.571995 | 20.692443 | 6.845083 |

The anti-reflection glass by one or both faces, in partial or total form, with an uniform finished perfectly homogenous, of a smooth tact and smooth, with an aspect that does not reflect light and pleasant at sight of the present invention includes the following properties and characteristics
an roughness Ra of 0.47 up to 0.77 and one roughness Rz of 2.6 up to 4.7 and
an (%) of Transmittance, (%) an Absorbance and (%) a Reflectance following:

| Wavelength λ | Transmittance (%) | Absorbance (%) | Reflectance (%) |
|---|---|---|---|
| 1200 | 81.885837 to 16.929765 | 79.026302 to 10.989631 | 7.380773 to 4.076545 |
| 864 | 82.857168 to 21.375396 | 73.927225 to 9.228357 | 8.167442 to 5.02918 |
| 860 | 82.755503 to 21.664599 | 73.557612 to 9.331631 | 8.167881 to 4.82118 |
| 716 | 87.04442 to 42.336523 | 52.982634 to 5.527914 | 7.872789 to 4.718592 |
| 708 | 87.360635 to 44.140635 | 51.090503 to 5.167307 | 7.90171 to 4.807321 |
| 706 | 87.340438 to 44.529332 | 50.684955 to 5.169483 | 7.919692 to 4.824307 |
| 704 | 87.424208 to 45.044311 | 50.160940 to 5.106954 | 7.915654 to 5.075115 |
| 518 | 90.798658 to 39.48331 | 55.878919 to 1.232843 | 8.603992 to 4.67989 |
| 516 | 90.835581 to 39.514671 | 55.844031 to 1.194371 | 8.615253 to 4.683449 |
| 514 | 90.792131 to 39.546552 | 55.800099 to 1.283580 | 8.617765 to 4.695609 |
| 512 | 90.831579 to 39.609889 | 55.742149 to 1.214116 | 8.618718 to 4.690174 |
| 510 | 90.859333 to 39.704018 | 55.641215 to 1.209110 | 8.63032 to 4.69704 |
| 504 | 90.809736 to 40.160104 | 55.144891 to 1.221636 | 13.992460 to 4.737644 |
| 498 | 90.726652 to 40.458465 | 54.810066 to 1.226495 | 8.700759 to 4.774439 |
| 462 | 90.261195 to 42.719007 | 52.273621 to 1.678186 | 8.700752 to 4.960855 |
| 458 | 90.21177 to 42.879824 | 52.087331 to 1.704758 | 8.724849 to 4.974734 |
| 406 | 90.008609 to 48.68701 | 45.939538 to 1.782444 | 8.85667 to 5.451464 |
| 404 | 89.919459 to 49.155471 | 45.276569 to 1.856904 | 8.896975 to 5.442153 |
| 402 | 89.880255 to 48.888568 | 45.704303 to 1.881903 | 8.90124 to 5.456235 |
| 398 | 89.667071 to 48.28114 | 46.381270 to 2.146637 | 8.914159 to 5.42438 |
| 352 | 79.431544 to 12.870009 | 82.616804 to 13.043682 | 8.015281 to 4.043287 |

Results and Conclusions
Results for Clear Anti-Reflection Glass:
As a result of the process to prepare anti-reflection glass by both faces, it is reduced to the transmittance of visible light for thicknesses of glass majors of 6 mm, from a 6% for thickness of 6 mm to a 10% for thickness of 9.5 mm. There is no significant change for smaller thicknesses of 4 mm.

If only is about the tinning face, the transmittance reduction is only of 3%, being observed similar results for the treatment of the atmospheric face.

However, for values of wavelengths in the infrared rank (1100 nm), the transmittance is reduced of continuous way from a value of 76% for glass of 2 mm of thickness to a 47% for thicknesses of 9.5 mm. Somewhat similar only happens for the treatments of one of the two faces, although the transmittance reduction goes respectively from 80 to 52%.

Results of Anti-Reflection for Different Types from Glass:
If it is applied to different types from glass, using mm of thickness like reference, the anti-reflection process exhibit transmittances of visible light that go of 83% for clear glass until a 42% for the glass of the type filtersun.

Remarkably, the transmittance for infrared is reduced still more for the green glass (16%), from a value of 70% of transmittance exhibited by the same glass in the case of visible light.

The blue glass also exhibits significant variations of the transmittance, of a 60% for the visible light to a 30% for infrared.

Similar tendencies are only observed for the treatment of one of the two faces.

Results of Roughness of Different Types from Glass:
Measurements of roughness were realized in glass samples, using equipment TR Surface Roughness Tester, marks Time Of the photographies can be observed surprising a homogenous roughness, reason why the resulting anti-reflection glass has a smooth and smooth tact, with an aspect that does not reflect light and pleasant at sight, that does not have other anti-reflection glasses similar.

Advantages
By the thermal characteristics and the obtained results of the tests realized in the anti-reflection glass of the present invention, an anti-reflection glass with excellent properties of pick up of the solar light for the applications in photovoltaic cells and in solar heater is surprising obtained, since we can apply different treatments to obtain different types from filters for different ranks of wavelength from the electromagnetic spectrum.

In addition it can be apply in construction industry, in home, in decoration, in industry of glass, etc., in that are needed anti-reflections glasses that have a smooth and smooth tact, with an aspect that does not reflect light and pleasant at sight and with defined values of transmittance, absorbance, reflectance and roughness, that do not have other well-known anti-reflections glasses at the moment.

Uses
Efficiency of the anti-reflection glasses and results obtained in real tests realized in applications in solar cells and solar heaters.

The anti-reflections glasses of the present invention are very efficient in the pick up of the solar energy and in the use in solar heaters; this due to studies realized in research centers and also ours part in real tests in a solar cell and a solar heater.

The chemical process to modify and to adapt the parameters and anti-reflections glass characteristics of the present invention, is according to the required needs of pick up of the solar energy to be used in solar paddles and solar heaters, since the anti-reflections glasses also have excellent thermal characteristics and of filtration of the different wavelengths from the electromagnetic spectrum, that next are detailed:

1.—Result of the measurements with anti-reflection glass of the present invention (efficiencies):

The tests with diverse anti-reflections glasses took place to measure the behavior of the current and the temperature in the solar cell, as well as the respective measurements in the solar heaters in order to obtain the best results as far as efficiency.

a) Solar cell, next in the table A are obtained values of current and temperature of the tests realized with more efficient anti-reflections glasses of the present invention:

TABLE A

| Type of anti-reflection glass used in the medition | Current average Amperes | Temperature average In ° C. |
|---|---|---|
| Photovoltaic cell (Panel of solar reception) | 3.81 amperes | 45 |
| Clear anti-reflection glass 2 mm with one face to the cell | 4.45 | 46.44 |
| Clear anti-reflection glass 2 mm with one face to the sun | 4.60 | 46.89 |
| Clear anti-reflection laminated glass 2.5 + .5 with one face to the cell | 3.544 | 50.21 |
| Clear anti-reflection laminated glass 2.5 + .5 with one face to the sun | 3.43 | 49.58 |
| Clear anti-reflection glass 4 mm Low-E with one face to the cell | 3.29 | 22.76 |
| Clear anti-reflection glass 4 mm Low-E with one face to the sun | 3.52 | 44.24 |
| Clear anti-reflection glass 2 mm by both faces, Tinning face to the cell | 4.24 | 59.16 |
| Clear anti-reflection glass 2 mm by both faces, tinning face to the sun | 4.47 | 54.65 |

It is possible to be observed that the Anti-reflection Glass of the present invention is 20% more efficient in the generation of Electrical Energy originating of the Solar Light, with respect to other materials, besides it is economic, more versatile by its great availability as far as size, colors, thicknesses and different types from glasses.

Solar Water Heater

These are the values of Temperature obtained in the tests realized with different Exhibited Heaters from Water from the Sun: C1 (Heater of polyethylene hose), C2 (Heater of copper tube), using different types from Glasses:

The C1 Heater and the C2 Heater without glass have a temperature average of 33° C.

Both Heaters (C1 and C2) using different types from Clear Anti-reflection Glass of different types from thicknesses, we observed temperature from 60° C. to 90° C. with an increase in the temperature of 100% of efficiency.

Therefore we have excellent properties and thermal characteristics for the application in the Alternating Power industry taking advantage of the Solar Energy.

It is noted that on this date, the best method known to the applicant to implement this invention, which is clear from this description of the invention.

What is claimed is:

1. An anti-reflection glass by one or both faces, in partial or total form, of a smooth and smooth tact, with an aspect that does not reflect the light and pleasant at sight characterized by: a roughness Ra of 0.47 μm up to 0.77 μm and one roughness Rz of 2.6 μm up to 4.7 μm and —a (%) of Transmittance, (%) Absorbance and (%) Reflectance following:

| Wavelength λ | Transmittance (%) | Absorbance (%) | Reflectance (%) |
|---|---|---|---|
| 1200 | 81.885837 to 16.929765 | 79.026302 to 10.989631 | 7.380773 to 4.076545 |
| 864 | 82.857168 to 21.375396 | 73.927225 to 9.228357 | 8.167442 to 5.02918 |
| 860 | 82.755503 to 21.664599 | 73.557612 to 9.331631 | 8.167881 to 4.82118 |
| 716 | 87.04442 to 42.336523 | 52.982634 to 5.527914 | 7.872789 to 4.718592 |
| 708 | 87.360635 to 44.140635 | 51.090503 to 5.167307 | 7.90171 to 4.807321 |
| 706 | 87.340438 to 44.529332 | 50.684955 to 5.169483 | 7.919692 to 4.824307 |
| 704 | 87.424208 to 45.044311 | 50.160940 to 5.106954 | 7.915654 to 5.075115 |
| 518 | 90.798658 to 39.48331 | 55.878919 to 1.232843 | 8.603992 to 4.67989 |
| 516 | 90.835581 to 39.514671 | 55.844031 to 1.194371 | 8.615253 to 4.683449 |
| 514 | 90.792131 to 39.546552 | 55.800099 to 1.283580 | 8.617765 to 4.695609 |
| 512 | 90.831579 to 39.609889 | 55.742149 to 1.214116 | 8.618718 to 4.690174 |
| 510 | 90.859333 to 39.704018 | 55.641215 to 1.209110 | 8.63032 to 4.69704 |
| 504 | 90.809736 to 40.160104 | 55.144891 to 1.221636 | 13.992460 to 4.737644 |
| 498 | 90.726652 to 40.458465 | 54.810066 to 1.226495 | 8.700759 to 4.774439 |
| 462 | 90.261195 to 42.719007 | 52.273621 to 1.678186 | 8.700752 to 4.960855 |
| 458 | 90.21177 to 42.879824 | 52.087331 to 1.704758 | 8.724849 to 4.974734 |
| 406 | 90.008609 to 48.68701 | 45.939538 to 1.782444 | 8.85667 to 5.451464 |
| 404 | 89.919459 to 49.155471 | 45.276569 to 1.856904 | 8.896975 to 5.442153 |
| 402 | 89.880255 to 48.888568 | 45.704303 to 1.881903 | 8.90124 to 5.456235 |
| 398 | 89.667071 to 48.28114 | 46.381270 to 2.146637 | 8.914159 to 5.42438 |
| 352 | 79.431544 to 12.870009 | 82.616804 to 13.043682 | 8.015281 to 4.043287. |

2. An anti-reflection glass in accordance with claim 1 characterized because the glass is selected of flat glass laminated having a thickness, of from 2 mm to 19 mm page 8 ln 9.

3. An anti-reflection glass in accordance with claim 2 characterized because the glass is selected of clear, blue, green, bronze and filtersun in thicknesses of 9.5 mm, 6 mm, 4 mm, 3 mm and 2 mm.

4. An anti-reflection glass in accordance with claim 1 characterized by being clear and having a 3 mm tinning face with the following values:

| Wavelength λ | Transmittance (%) | Absorbance (%) | Reflectance (%) |
|---|---|---|---|
| 1200 | 78.644133 | 14.393106 | 7.018912 |
| 768 | 83.34111 | 9.550472 | 7.165744 |
| 510 | 90.589333 | 1.273453 | 7.938662 |
| 402 | 89.847631 | 2.199590 | 8.025004 |
| 352 | 76.460312 | 16.718469 | 6.932133. |

5. An anti-reflection glass in accordance with claim 1 characterized by having a green color and a 6 mm tinning face with the following values:

| Wavelength λ | Transmittance (%) | Absorbance (%) | Reflectance (%) |
|---|---|---|---|
| 1200 | 17.068445 | 78.630483 | 4.335758 |
| 516 | 79.161207 | 13.761383 | 7.141685 |
| 510 | 79.15717 | 13.754786 | 7.152416 |
| 498 | 78.625216 | 14.258256 | 7.181158 |
| 352 | 13.841152 | 81.682453 | 4.549182. |

6. An anti-reflection glass in accordance with claim 1 characterized by having a blue color and a 6 mm tinning face with the following values:

| Wavelength λ | Transmittance (%) | Absorbance (%) | Reflectance (%) |
|---|---|---|---|
| 1200 | 30.174288 | 65.132958 | 4.730599 |
| 768 | 48.375286 | 46.316540 | 5.350982 |
| 458 | 78.07144 | 14.485939 | 7.510213 |
| 404 | 77.699684 | 14.714660 | 7.654547 |
| 352 | 29.433254 | 65.363094 | 5.288264. |

7. An anti-reflection glass in accordance with claim 1 characterized by being a filtersun anti-reflection glass with a 6 mm tinning face with the following values:

| Wavelength λ | Transmittance (%) | Absorbance (%) | Reflectance (%) |
|---|---|---|---|
| 1200 | 38.248152 | 57.283587 | 4.504295 |
| 860 | 45.57881 | 48.963448 | 5.507308 |
| 716 | 58.016778 | 36.552033 | 5.474989 |
| 404 | 51.759193 | 42.822717 | 5.467296 |
| 352 | 13.876504 | 81.989474 | 4.201242. |

8. An anti-reflection glass in accordance with claim 1 characterized by being a bronze anti-reflection glass having a 6 mm tinning face with the following values:

| Wavelength λ | Transmittance (%) | Absorbance (%) | Reflectance (%) |
|---|---|---|---|
| 1200 | 41.262608 | 53.780830 | 4.996534 |
| 708 | 60.49915 | 33.706325 | 5.841255 |
| 706 | 60.494071 | 33.688703 | 5.864139 |
| 402 | 49.160005 | 45.269163 | 5.621425 |
| 352 | 12.870009 | 82.616804 | 4.586572. |

9. An anti-reflection glass in accordance with claim 1 characterized by being clear and having a 9.5 mm tinning face with the following values:

| Wavelength λ | Transmittance (%) | Absorbance (%) | Reflectance (%) |
|---|---|---|---|
| 1200 | 55.076298 | 39.441680 | 5.526232 |
| 768 | 66.741681 | 27.193864 | 6.113362 |
| 516 | 87.694492 | 4.487519 | 7.88899 |
| 404 | 84.513273 | 7.580253 | 7.978279 |
| 352 | 51.676342 | 42.439453 | 5.979883. |

10. An anti-reflection glass in accordance with claim 1 characterized by being clear and having a 2 mm tinning face with the following values:

| Wavelength λ | Transmittance (%) | Absorbance (%) | Reflectance (%) |
|---|---|---|---|
| 1200 | 81.885837 | 10.989631 | 7.181988 |
| 768 | 85.370796 | 7.373423 | 7.314295 |
| 516 | 90.835581 | 1.194371 | 8.04243 |
| 398 | 89.667071 | 2.146637 | 8.319402 |
| 352 | 79.431544 | 13.043682 | 7.647128. |

11. An anti-reflection glass in accordance with claim 1 characterized by being clear and having a 6 mm tinning face with the following values:

| Wavelength λ | Transmittance (%) | Absorbance (%) | Reflectance (%) |
|---|---|---|---|
| 1200 | 63.958581 | 30.027753 | 6.062163 |
| 768 | 73.773534 | 19.721167 | 6.557761 |
| 504 | 88.843097 | 3.168592 | 8.060859 |
| 398 | 87.564652 | 4.267736 | 8.300419 |
| 352 | 67.679699 | 25.510774 | 6.920251. |

12. An anti-reflection glass in accordance with claim 1 characterized by being clear and having a 4 mm tinning face with the following values:

| Wavelength λ | Transmittance (%) | Absorbance (%) | Reflectance (%) |
|---|---|---|---|
| 1200 | 76.216851 | 17.078986 | 6.758229 |
| 768 | 81.68622 | 11.324317 | 7.04583 |
| 516 | 90.237218 | 1.778335 | 8.05696 |
| 404 | 88.85629 | 2.881935 | 8.336806 |
| 352 | 73.17317 | 19.645954 | 7.297638. |

13. An anti-reflection glass in accordance with claim 1 characterized by being a bronze anti-reflection glass having a 6 mm atmospheric face with the following values:

| Wavelength λ | Transmittance (%) | Absorbance (%) | Reflectance (%) |
|---|---|---|---|
| 1200 | 37.472047 | 57.807415 | 4.758607 |
| 768 | 51.474663 | 43.346415 | 5.220687 |
| 704 | 58.262519 | 36.159877 | 5.622585 |
| 404 | 48.875354 | 45.731472 | 5.442153 |
| 352 | 13.098763 | 82.597554 | 4.373662. |

14. An anti-reflection glass in accordance with claim 1 characterized by being clear and having a 9.5 atmospheric face with the following values:

| Wavelength λ | Transmittance (%) | Absorbance (%) | Reflectance (%) |
|---|---|---|---|
| 1200 | 54.887018 | 39.388824 | 5.770321 |
| 768 | 66.592167 | 27.104402 | 6.354265 |
| 518 | 87.490163 | 4.413112 | 8.170257 |
| 498 | 87.059359 | 4.790729 | 8.223927 |
| 352 | 51.211671 | 42.897326 | 5.986792. |

15. An anti-reflection glass in accordance with claim 1 characterized being clear and having a 6 mm atmospheric face with the following values:

| Wavelength λ | Transmittance (%) | Absorbance (%) | Reflectance (%) |
|---|---|---|---|
| 1200 | 64.698742 | 29.136657 | 6.214316 |
| 768 | 73.644673 | 19.661713 | 6.747595 |
| 514 | 88.679266 | 3.089681 | 8.305805 |
| 406 | 86.547044 | 5.071045 | 8.458033 |
| 352 | 62.5142 | 30.889970 | 6.703079. |

16. An anti-reflection glass in accordance with claim 1 characterized by being clear and having a 2 mm atmospheric face with the following values:

| Wavelength λ | Transmittance (%) | Absorbance (%) | Reflectance (%) |
|---|---|---|---|
| 1200 | 81.4349 | 11.274143 | 7.349755 |
| 768 | 84.661915 | 7.822142 | 7.576555 |
| 518 | 89.278921 | 2.507868 | 8.287801 |
| 404 | 87.951759 | 3.580425 | 8.544718 |
| 352 | 76.879695 | 15.395051 | 7.850868. |

17. An anti-reflection glass in accordance with claim 1 characterized by being clear and having a 4 mm atmospheric face with the following values:

| Wavelength λ | Transmittance (%) | Absorbance (%) | Reflectance (%) |
|---|---|---|---|
| 1200 | 74.996719 | 17.883751 | 7.176946 |
| 510 | 80.706403 | 10.740950 | 8.63032 |
| 504 | 80.690959 | 10.732012 | 8.654923 |
| 402 | 80.070163 | 11.147091 | 8.862509 |
| 352 | 65.729735 | 26.756293 | 7.63615. |

18. An anti-reflection glass in accordance with claim 1 characterized by being a filtersun anti-reflection glass having a 6 mm atmospheric face with the following values:

| Wavelength λ | Transmittance (%) | Absorbance (%) | Reflectance (%) |
|---|---|---|---|
| 1200 | 79.47698 | 13.201293 | 7.380773 |
| 768 | 83.230641 | 9.190861 | 7.639615 |
| 516 | 89.314825 | 2.159708 | 8.602893 |
| 400 | 87.886444 | 3.342024 | 8.914159 |
| 352 | 75.90081 | 16.212153 | 8.015281. |

19. An anti-reflection glass in accordance with claim 1 characterized by being a filtersun anti-reflection glass having a 6 mm atmospheric face with the following values:

| Wavelength λ | Transmittance (%) | Absorbance (%) | Reflectance (%) |
|---|---|---|---|
| 1200 | 38.248152 | 57.283587 | 4.504295 |
| 860 | 45.57881 | 48.963448 | 5.507308 |
| 716 | 58.016778 | 36.552033 | 5.474989 |
| 404 | 51.759193 | 42.822717 | 5.467296 |
| 352 | 13.876504 | 81.989474 | 4.201242. |

20. An anti-reflection glass in accordance with claim 1 characterized by having a green color and a 6 mm atmospheric face with the following values:

| Wavelength λ | Transmittance (%) | Absorbance (%) | Reflectance (%) |
|---|---|---|---|
| 1200 | 16.929765 | 79.026302 | 4.076545 |
| 768 | 32.047922 | 63.659461 | 4.327235 |
| 512 | 78.548075 | 14.583206 | 6.931099 |
| 498 | 78.03792 | 15.076037 | 6.94858 |
| 352 | 13.633363 | 82.388043 | 4.043287. |

21. An anti-reflection glass in accordance with claim 1 characterized by having a blue color and a 6 mm atmospheric face with the following values:

| Wavelength λ | Transmittance (%) | Absorbance (%) | Reflectance (%) |
|---|---|---|---|
| 1200 | 29.716093 | 65.853502 | 4.466134 |
| 768 | 47.776695 | 47.201392 | 5.062412 |
| 462 | 76.823201 | 16.034729 | 7.206932 |
| 406 | 76.282492 | 16.471380 | 7.311935 |
| 352 | 29.00071 | 66.272025 | 4.804131. |

22. An anti-reflection glass in accordance with claim 1 characterized by being clear and having to faces of 4 mm atmospheric with the following values:

| Wavelength λ | Transmittance (%) | Absorbance (%) | Reflectance (%) |
|---|---|---|---|
| 1200 | 76.063514 | 17.498145 | 6.490263 |
| 516 | 89.799214 | 2.654473 | 7.614847 |
| 504 | 89.770216 | 2.649769 | 7.648855 |
| 404 | 88.509291 | 3.728925 | 7.832274 |
| 352 | 72.571995 | 20.692443 | 6.845083. |

23. The use of an anti-reflection glass of claim 1 to make solar cells, photovoltaic cells and heating lots.

\* \* \* \* \*